United States Patent [19]
Kojima

[11] Patent Number: 5,402,252
[45] Date of Patent: Mar. 28, 1995

[54] IMAGE READER AND IMAGE REPRODUCING SYSTEM BOTH HAVING A LINE SENSOR

[75] Inventor: Akio Kojima, Neyagawa, Japan

[73] Assignee: Matsushita Electric Industrial Co., Ltd., Osaka, Japan

[21] Appl. No.: 898,093

[22] Filed: Jun. 12, 1992

[30] Foreign Application Priority Data

Jun. 14, 1991 [JP] Japan .................. 3-142926
Feb. 27, 1992 [JP] Japan .................. 4-041145

[51] Int. Cl.⁶ .............................................. H04N 1/00
[52] U.S. Cl. ..................................... 358/486; 358/474; 358/447
[58] Field of Search ............... 358/474, 412, 406, 401, 358/411, 413, 419, 420, 421, 422, 423, 475, 477, 480, 486, 489, 493, 494, 497, 443, 451, 460, 409, 408, 76, 298, 447, 280, 256, 282, 287, 296; 250/327.2, 578

[56] References Cited

U.S. PATENT DOCUMENTS

| | | |
|---|---|---|
| 4,367,493 | 1/1983 | Matteson . |
| 4,454,537 | 6/1984 | Okada et al. . |
| 4,475,131 | 10/1984 | Nishizawa et al. . |
| 4,628,368 | 12/1986 | Kurata et al. .......... 358/293 |
| 4,687,944 | 8/1987 | Mitsuka et al. .......... 250/578 |
| 4,752,891 | 6/1988 | Van Daele et al. . |
| 5,151,597 | 9/1992 | Agano .................. 250/327.2 |

FOREIGN PATENT DOCUMENTS

| | | |
|---|---|---|
| 2137469 | 5/1990 | Japan . |
| 228867 | 7/1990 | Japan . |
| 344474 | 7/1991 | Japan . |
| 3219764 | 9/1991 | Japan . |

*Primary Examiner*—Paul Ip
*Attorney, Agent, or Firm*—Price, Gess & Ubell

[57] ABSTRACT

The present invention provides an image reader comprising an image reading line sensor for reading out data from an original document line by line to be converted into digital image data, a storage device capable of storing at least one line of read-out data, a sub-scanning device for controlling the image reading line sensor such that the line sensor accelerates up to a scanning speed which is equal to or higher than a record-scanning speed of an image data output device, a first controlling device for determining a first line and a last line to be read by the image reading line sensor in a sub-scanning direction, in relation to the sub-scanning speed of the image reading line sensor, and a second controlling device for controlling the storage device to sequentially store image data items which fall in an effective range on one line of image data read by the image reading line sensor, the storing of data being carried out during a fixed time period equal to or shorter than a minimum duration of a cycle in which one line is read out, and to sequentially release the stored image data items line by line in accordance with the record-scanning speed of the output device.

40 Claims, 11 Drawing Sheets

IMAGE READER AND IMAGE REPRODUCING SYSTEM BOTH HAVING A LINE SENSOR

BACKGROUND OF THE INVENTION

1. Field of the Invention

The present invention relates to an image reader in which read-scan of original images is performed by the use of a line sensor and to an image reproducing system having a read scanning section of the similar structure to that of the above image reader.

2. Related Art

Through the recent development of image recording technology, recording speed has been remarkably increased. In contrast with the improvement of recording speed, there is a practical limit to the increase of image reading speed because images are read by a scanner driven in a reciprocating manner so that image reading speed not only device a speed at which images are actually read, but is associated with the speed of the scanner as it accelerates/decelerates and as it returns to the initial position.

It is therefore difficult to increase the speed of continuous recording operation when multiple coping of one original document or multiple copying of multiple original documents is performed.

One known method for overcoming the foregoing problem is such that when multiple copying of one original document is carried out, images read by a scanner are once stored in a page memory and then the stored images are repeatedly read out and recorded. This technique is disclosed in Japanese Patent Publication No. 28867/1990.

The page memory taught by the above prior art is effective when continuous recording of one original document is carried out at high speed. However, when multiple copying of multiple original documents is carried out, high-speed copying cannot be always achieved by simply employing a large-capacity memory such as the page memory because the time required for the replacement of original documents is also a key to be considered for saving time. It is true in view of the above point that the prior art does not effectively utilize the large-capacity memory, i.e., the page memory.

SUMMARY OF THE INVENTION

Accordingly, it is a primary object of the present invention to provide an image reproducing system wherein by the effective use of a small-capacity memory, image data are recorded at high speed both in the case of multiple copying of one original document and in the case of multiple copying of multiple original documents.

Another object of the invention is to provide an image reader that is best suited for the above image reproducing system.

Another object of the invention is to provide an image reader capable of reading image data for a short sub-scanning period.

A further object of the invention is to provide an image reader that ensures constant resolution for sub-scanning even if the scanning speed of the line sensor varies.

Still a further object of the invention is to provide an image reader that enables quantization faithful to the density of an original document even if the light-receiving amount varies although images have the same density, such variation being due to changes in the scanning speed of the line sensor.

The above objects can be achieved by providing an image reproducing system comprising an image reading line sensor for reading out data from an original document line by line to be converted into digital image data, a storage device capable of storing at least one line of read-out data, a recording device for reading data from the storage device and recording the data at a fixed record-scanning speed, a sub-scanning device for controlling the image reading line sensor such that the line sensor accelerates up to a scanning speed which is equal to or higher than the record-scanning speed of the recording device, a first controlling device for determining a first line and a last line to be read by the image reading line sensor in a sub-scanning direction, in relation to the sub-scanning speed of the image reading line sensor, and a second controlling device for controlling the storage device to sequentially store image data items which fall in an effective range on one line of image data read by the image reading line sensor, the storing of data being carried out during a fixed time period equal to or shorter than a minimum duration of a cycle in which one line is read out, and to sequentially release the stored image data items line by line in accordance with the record-scanning speed of the recording device.

The above objects can be also achieved by providing an image reader comprising an image reading line sensor for reading out data from an original document line by line to be converted into digital image data, a storage device capable of storing at least one line of read-out data, a sub-scanning device for controlling the image reading line sensor such that the line sensor accelerates up to a scanning speed which is equal to or higher than a record-scanning speed of an image data output device, a first controlling device for determining a first line and a last line to be read by the image reading line sensor in a sub-scanning direction, in relation to the sub-scanning speed of the image reading line sensor, and a second controlling device for controlling the storage device to sequentially store image data items which fall in an effective range on one line of image data read by the image reading line sensor, the storing of data being carried out during a fixed time period equal to or shorter than a minimum duration of a cycle in which one line is read out, and to sequentially release the stored image data items line by line in accordance with the record-scanning speed of the output device.

The image reproducing system may further comprise a timing Generator for generating a timing signal for determining the duration of the cycle in which one line is read by the image reading line sensor, and a timing controlling device for varying the time interval between generations of the timing signal, according to the sub-scanning speed of the image reading line sensor such that constant resolution can be obtained even if the sub-scanning speed varies.

The image reproducing system may be arranged such that it further comprises a speed detection device for detecting the sub-scanning speed of the image reading line sensor and the timing controlling device controls the time interval between generations of the timing signal, according to the result of detection executed by the speed detection device.

The image reproducing system may be also arranged such that the timing controlling device varies, on a scanning line basis, the time interval between generations of the timing signal executed by the timing generator.

The image reproducing system may be further arranged such that the first controlling device allows the image reading line sensor to start its image reading operation when the time interval between generations of the timing signal falls within a range within which the time interval is controllable by the timing controlling device and to terminate the image reading operation when the time interval is out of the range.

The image reproducing system may be arranged such that the second controlling device executes only storing of image data while the image reading line sensor accelerates in the sub-scanning direction and allows the stored image data to be released after the image reading line sensor has started scan at the fixed speed or a decelerated speed in the sub-scanning direction.

The image reproducing system may be arranged such that a maximum storage amount by the storage device is equal to the difference between the amount of read-out image data that have been sequentially input from the image reading line sensor to the storage device and the amount of image data that have been sequentially output from the storage device line by line in accordance with the record-scanning speed of the recording device.

The image reproducing system may be arranged such that the timing controlling device varies, on a scanning line basis, the time interval between generations of the timing signal executed by the timing generator.

The image reproducing system may be arranged such that it further comprises specifying device for specifying an original document size and the sub-scanning device alters the sub-scanning speed of the image reading line sensor in accordance with the original document size thus specified.

The image reproducing system may be arranged such that it further comprises a timing generator for generating a timing signal to determine the duration of the cycle in which one line is read by the image reading line sensor, and a timing controlling device for varying the time interval between generations of the timing signal, according to the sub-scanning speed of the image reading line sensor such that constant resolution can be obtained even if the sub-scanning speed varies.

The image reproducing system may be arranged such that it further comprises a speed detection device for detecting the sub-scanning speed of the image reading line sensor, and the timing controlling device controls the time interval between generations of the timing signal, according to the result of detection executed by the speed detection device.

The image reproducing system may be arranged such that the timing controlling device varies, on a scanning line basis, the time interval between generations of the timing signal executed by the timing generator.

The image reproducing system may be arranged such that the first controlling device allows the image reading line sensor to start its image reading operation when the time interval between generations of the timing signal falls within a range within which the time interval is controllable by the timing controlling device and to terminate the image reading operation when the time interval is out of the range.

The image reproducing system may be arranged such that the second controlling device executes only storing of image data while the image reading line sensor accelerates in the sub-scanning direction and allows the stored image data to be released after the image reading line sensor has started scan at the fixed speed or a decelerated speed in the sub-scanning direction.

The image reproducing system may be arranged such that a maximum storage amount by the storage device is equal to the difference between the amount of read image data that have been sequentially input from the image reading line sensor to the storage device and the amount of image data that have been sequentially output from the storage device line by line in accordance with the record-scanning speed of the recording device.

The image reproducing system may be arranged such that the timing controlling device varies, on a scanning line basis, the time interval between generations of the timing signal executed by the timing generator.

The image reproducing system may be arranged such that it further comprises an amplifier for amplifying an output image signal from the image reading line sensor, and an amplification controlling device for varying the amount of amplification executed by the amplifier in accordance with the time interval between generations of the timing signal executed by the timing generator.

The image reproducing system may be arranged such that it further comprises a black level correcting device for correcting a black level signal issued from the image reading line sensor, and a correction controlling device for varying a correction value for the black level correcting device in accordance with the amplification amount of the amplifier. The image reproducing system may be arranged such that on a scanning line basis, the amplification controlling device varies the amplification amount of the amplifier and the correction controlling device varies the correction value for the black level correcting device.

The image reproducing system may be arranged such that the amplification controlling device computes data for the amplification amount by interpolation from the data of a maximum amplification amount and the data of a minimum amplification amount which are set in the amplifier, and varies the amplification amount of the amplifier in accordance with the varying time interval between generations of the timing signal executed by the timing generator.

The image reproducing system may be arranged such that it further comprises a black level correcting device for correcting a black level signal issued from the image reading line sensor, a temperature detecting device for detecting the difference between a temperature at which the black level correction for the image reading line sensor is performed and a temperature at which data are read out from the original document, and a correction controlling device for varying a correction value for the black level correcting device in accordance with the amplification amount of the amplifier and the amount of a change in temperature detected by the temperature detecting device.

The image reproducing system may be arranged such that on a scanning line basis, the amplification correcting device varies the amplification amount of the amplifier and the correction controlling device varies the correction value for the black level correcting device.

The timing controlling device may vary, on a basis of a cycle of a transfer pulse in which the image data read by the reading line sensor is transferred therefrom, the time interval between generations of the timing signal executed by the timing generator.

The transfer pulse may maintain a constant cycle without varying in accordance with the scanning speed.

The image reproducing system may be arranged such that on a basis of a cycle of a transfer pulse in which the image data read by the reading line sensor is transferred therefrom, the timing controlling device varies the time interval between generations of the timing signal executed by the timing generator.

The image reproducing system may be arranged such that the transfer pulse maintains a constant cycle without varying in accordance with the scanning speed.

According to the invention, the sub-scanning device accelerates the image reading line sensor up to a scanning speed higher than the record-scanning speed of the image data output device. Further, the second controlling device performs control operation in such a way that writing of read-out data in the storage device is performed within the duration of a cycle in which one line of data is read by the line sensor, and reading-out of data from the storage device is performed in accordance with the record-scanning speed of the image data output device.

With the above arrangement, a small-capacity memory can be employed since only the difference between image data obtained by scanning of the original document with the image reading line sensor and image data to be released to the output device should be stored in the storage device. In addition, the first line and the last line which the image reading line sensor reads in one sub-scan can be controlled by the first controlling device according to the sub-scanning speed of the image reading line sensor so that image reading operation can be performed during the period in which the image reading line sensor accelerates and the period in which it decelerates. Therefore, the amount of image data read out by one sub-scan can be increased, in other words, the time required for reading a certain amount of image data can be reduced. This ensures high-speed continuous operation in both the cases of multiple copying of one document and multiple copying of multiple documents, these copying operations being carried out by repeating the sub-scan with the image reading line sensor.

The provision of the timing controlling device enables it to vary the time interval between generations of a timing signal, the generations being carried out by the timing generator, in accordance with the scanning speed of the image reading line sensor. This results in that read-scan can be performed with a fixed sub-scanning resolution even if the scanning speed of the image reading line sensor varies.

Further, the provision of the amplification controlling device enables it to vary the amount of amplification executed by the amplifier in accordance with the time interval between generations of a timing signal executed by the timing generator. This has such an effect that even if the time interval between generations of a timing signal executed by the timing generator varies, analog image signals generated prior to quantization can be controlled so as to be a specified level, thereby performing high-precision quantization.

Furthermore, the provision of the correction controlling device enables it to vary the correction value for the black level correcting device in accordance with the amplification amount of the amplifier. This prevents the occurrence of an error in the correction value that is for use in the correction of the black level signal issued from the image reading line sensor and has been stored prior to read-scan of the original document, the error being caused owing to changes in the amplification amount of the amplifier, so that there is no need to store a correction value again in the course of the read-scanning operation by resetting the amplification amount.

This correction controlling device may be arranged to vary the correction value for the black level correcting device in accordance with the amplification amount of the amplifier and the amount of a change in temperature detected by the temperature detecting device, whereby the occurrence of an error in the correction value, which is for use in the correction of the black level signal issued from the image reading line sensor and has been stored prior to read-scan of the original document, is prevented, the error being caused owing to changes in the amplification amount of the amplifier and changes in temperature. This advantageously eliminates the necessity for resetting of the amplification amount and resetting (caused by changes in temperature) of a correction value in the course of the read-scanning operation.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
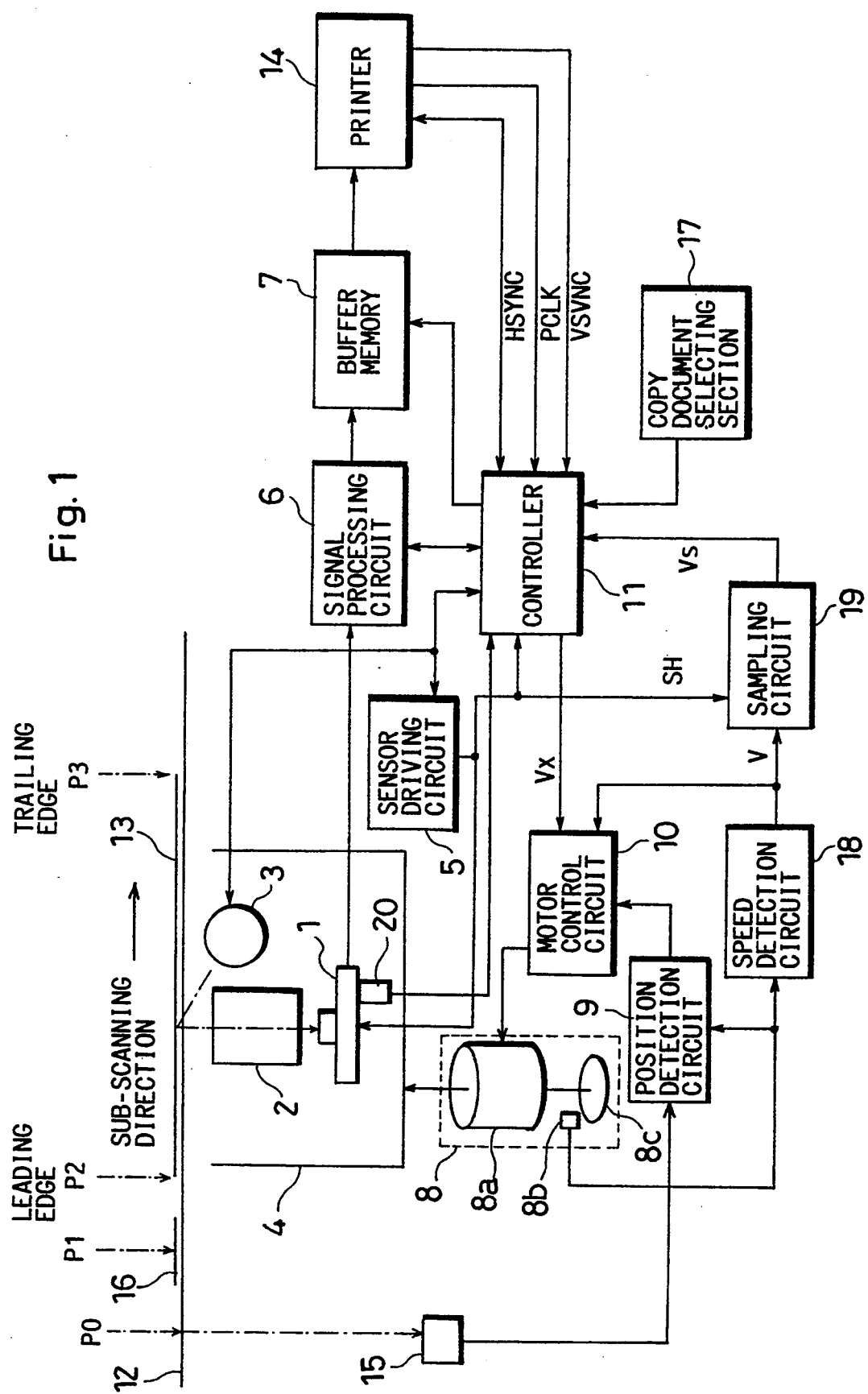
FIG. 1 is a block diagram of an image reader and image reproducing system according to an embodiment of the invention.

FIG. 1 shows in block form an image reader and image reproducing system according to one embodiment of the invention.

In FIG. 1, a reflected light image from an original document 13 which is placed on an original glass plate 12 and has been exposure-scanned by a light source 3, is formed into an image, by means of a lens unit 2, on each light receiving element disposed on a line sensor 1. The line sensor 1 includes a photoelectric conversion element for use in e.g. a CCD camera etc., and this element converts the original image thus formed into analog image signals. The photoelectric conversion element shown in FIG. 1 is of the adhesion type, but it may be of the reduction type. A photoelectric conversion element of the reduction type is designed such that the reflected light image is guided to a reduction lens using a plurality of reflection mirrors, and the reflected light image that has passed through the reduction lens is reduced and formed into an image on the line sensor 1. The line sensor 1 supplies an analog image signal to a signal processing circuit 6 in synchronism with a transfer pulse SH and a pixel clock SCLK issued from a sensor driving circuit 5.

The signal processing circuit 6 amplifies the analog image signal supplied from the line sensor 1 and an A/D convertor included in the signal processing circuit 6 converts the analog image signal into a digital image signal. Black level correction (black shading correction) and white level correction (white shading correction) are performed on the digital image signal, and density-wise conversion is performed such that the linear signal in terms of reflectance is converted into a linear signal in terms of density. The signal thus obtained is supplied to a buffer memory 7. The correction factor of black level correction is controlled by a controller 11 in accordance with an output value from a temperature detection sensor 20 installed in the line sensor 1.

The sensor driving circuit 5 generates the transfer pulse SH for transferring the electrical charge of the light-sensitive section of the line sensor 1 to a shift register for output, and the pixel clock SCLK and an image effective signal SEN that are synchronous with the transfer pulse SH. These are sent to the line sensor 1, the controller 11 and a sampling circuit 19. The pulse interval of the transfer pulse SH corresponds to the storage time of light signals from the line sensor 1.

A carriage unit 4 is a casing accommodating the line sensor 1, the lens unit 2 and the light source 3 therein and is movable in a sub-scanning direction. The movement of the carriage unit 4 for sub-scan is carried out by a motor section 8 to be described below.

The motor section 8 is composed of a driving motor 8a; a rotary encoder 8c mounted on the driving shaft of the driving motor 8a; and a detection sensor 8b for detecting a slit of the rotary encoder 8c and generating a pulse.

In the course of read-scan of the original document 13, a motor control circuit 10 drives and controls the motor 8a in compliance with control signals from the controller 11, the control signals instructing a specified scanning speed, a specified range to be scanned and the initiation of driving so that the carriage unit 4 travels together with the light source 3, the lens unit 2 and the line sensor 1. This causes the line sensor 1 to be driven in a reciprocating manner in the sub-scanning direction between a leading edge P2 and a trailing edge P3 of the original document 13. As a result, the line sensor 1 repeatedly read-scans the original document 13 from the leading edge P2 to the trailing edge P3 thereof. While the signal processing circuit 6 is in its correcting operation, the motor control circuit 10 controls the operation of the motor 8a in accordance with a control signal from the controller 11 so as to move the line sensor 1 to a position P1 of a reference white plate 16 for use in level correction and to stop it thereat.

After the signal processing circuit 6 has completed the correction processing, the line sensor 1 is allowed to return to the start position and to stop thereat. A position detection circuit 9 initializes an internal position signal from a position sensor 15 disposed at a reference position P0 and supplies a relative position signal to the motor control circuit 10, the relative position signal indicating the travel amount of the line sensor 1 which has travelled from the reference position P0. The generation of the relative position signal is performed by detecting pulses from the rotary encoder 8c mounted on the driving shaft of the motor 8a by means of the detection sensor 8b and counting the number of pulses thus detected. The motor control circuit 10 is able to detect from the relative position signal the position of the line sensor 1 in relation to the position P1 of the reference white plate 16, the leading edge P2 and trailing edge P3 of the original document 13 and the original document 13.

A speed detection circuit 18 measures the pulse interval of pulses from the sensor 8b by means of an internal clock in order to generate and release a sub-scanning speed signal V to the motor control circuit 10 and the sampling circuit 19. The motor control circuit 10 controls, based on the difference between a sub-scanning speed Vx preset by the controller 11 and the speed signal V, the motor 8a such that the sub-scanning speed of the line sensor 1 housed in the carriage unit 4 becomes constant at the preset value Vx.

The sampling circuit 19 samples the speed signal V in synchronism with the transfer pulse SH issued from the sensor driving circuit 5.

A copy document selecting section 17 is provided with a plurality of selection buttons such as LETTER and LEDGER for specifying a copy size. The operator may specify a copy size and start copying operation by depressing one of these selection buttons. After a copy size has been specified, the copy document selecting section 17 provides the controller 11 with data for setting the copy size.

Upon receipt of the copy size data from the copy document selecting section 17, the controller 11 sets a processing value corresponding to the copy size, in the sensor driving circuit 5, the signal processing circuit 6, the buffer memory 7 and the motor control circuit 10. After the settings, the controller 11 transfers the copy size data and a record starting signal to a printer 14 and issues a control signal to the motor control circuit 10 in synchronism with a detection signal for detecting the leading edge of a copy sheet (hereinafter referred to as VSYNC) issued from the printer 14. The controller 11 receives, from the printer 14, VSYNC, a raster-scan synchronization signal (hereinafter referred to as HSYNC) and a pixel clock (hereinafter referred to as PCLK) synchronous with HSYNC, and issues a control signal to the buffer memory 7. Further, the controller 11 issues a control signal to the signal processing circuit 6 and the buffer memory 7 in compliance with the transfer pulse SH, the pixel clock SCLK synchronous with the transfer pulse SH and the image effective signal SEN, these being fed from the sensor driving circuit 5, so that the buffer memory 7 stores digital image signals sequentially.

Figure 9:
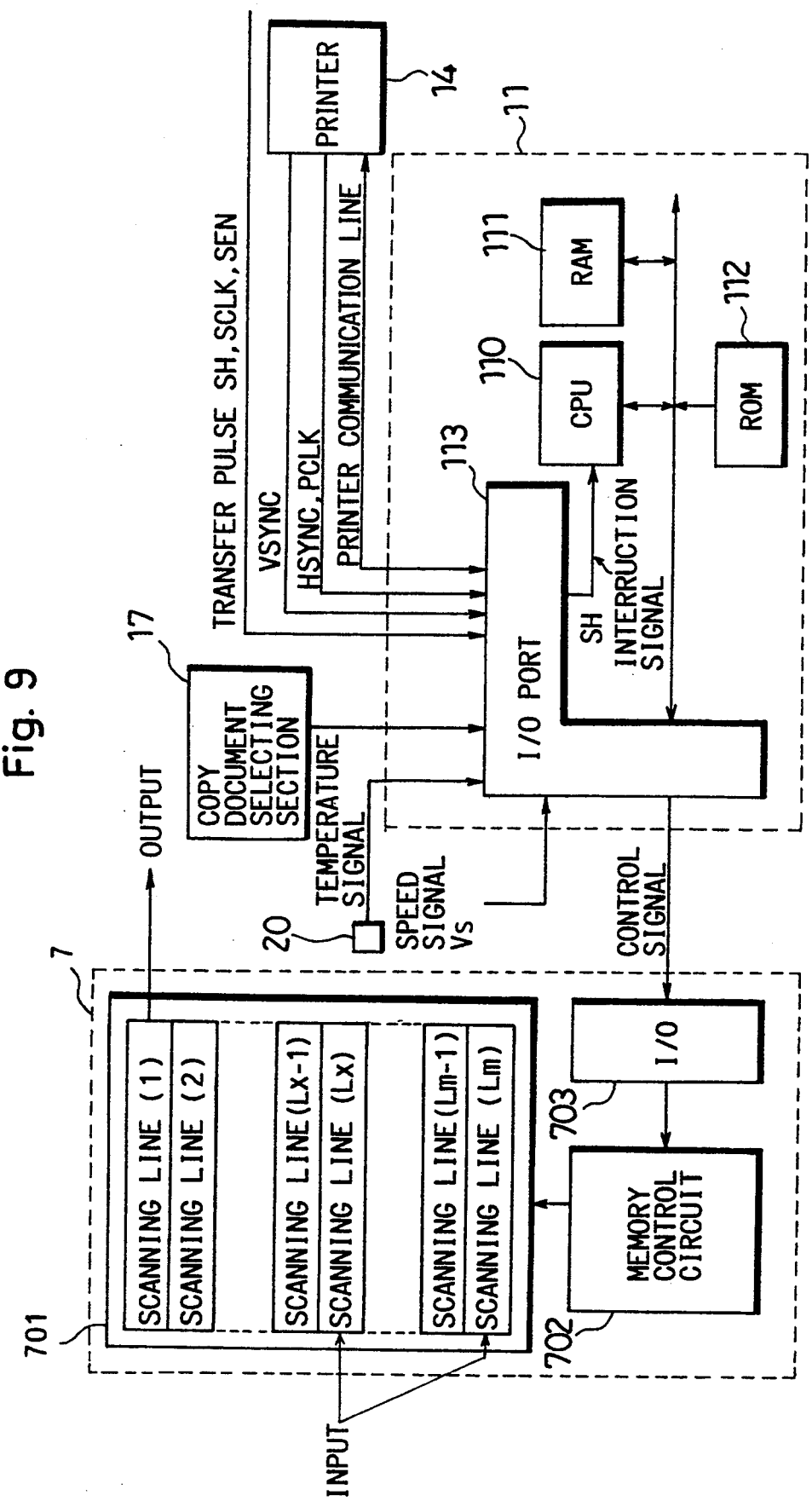
FIG. 9 is a diagram illustrating a buffer memory 7.

FIG. 9 shows the organization of the controller 11 in detail. As shown in FIG. 9, the controller 11 is composed of a CPU 110, a RAM 111, a ROM 112 and an I/O port 113.

In response to a control signal from the controller 11, the buffer memory 7 sequentially stores the digital image signal fed from the signal processing circuit 6 and sequentially releases the same to the printer 14. The organization of the buffer memory 7 is shown in detail in FIG. 9.

A laser beam printer utilizing the electrophotographic process, for example, is employed as the printer 14. In the printer 14, a laser beam signal modulated by an input image signal is exposure-scanned by raster-scan on a photoreceptor that has been entirely electrically charged so that an electrostatic latent image is formed, and then the image portion is developed with a developer. Thereafter, the toner of the developed image is transferred onto a sheet and fixed on the sheet by a fixing device. The above steps of charging, exposure, development, transferring and fixing are repeatedly performed thereby successively recording input image signals on recording sheets. The printer 14 issues VSYNC, HSYNC and PCLK synchronous with HSYNC to the controller 11. The printer 14 selects recording sheets in accordance with the copy size data transferred from the controller 11 and repeatedly performs the steps of charging, exposure, development, transfer and fixing on input image signals from the buffer memory 7, thereby continuously recording the image data on the sheets of the specified size.

Figure 2:
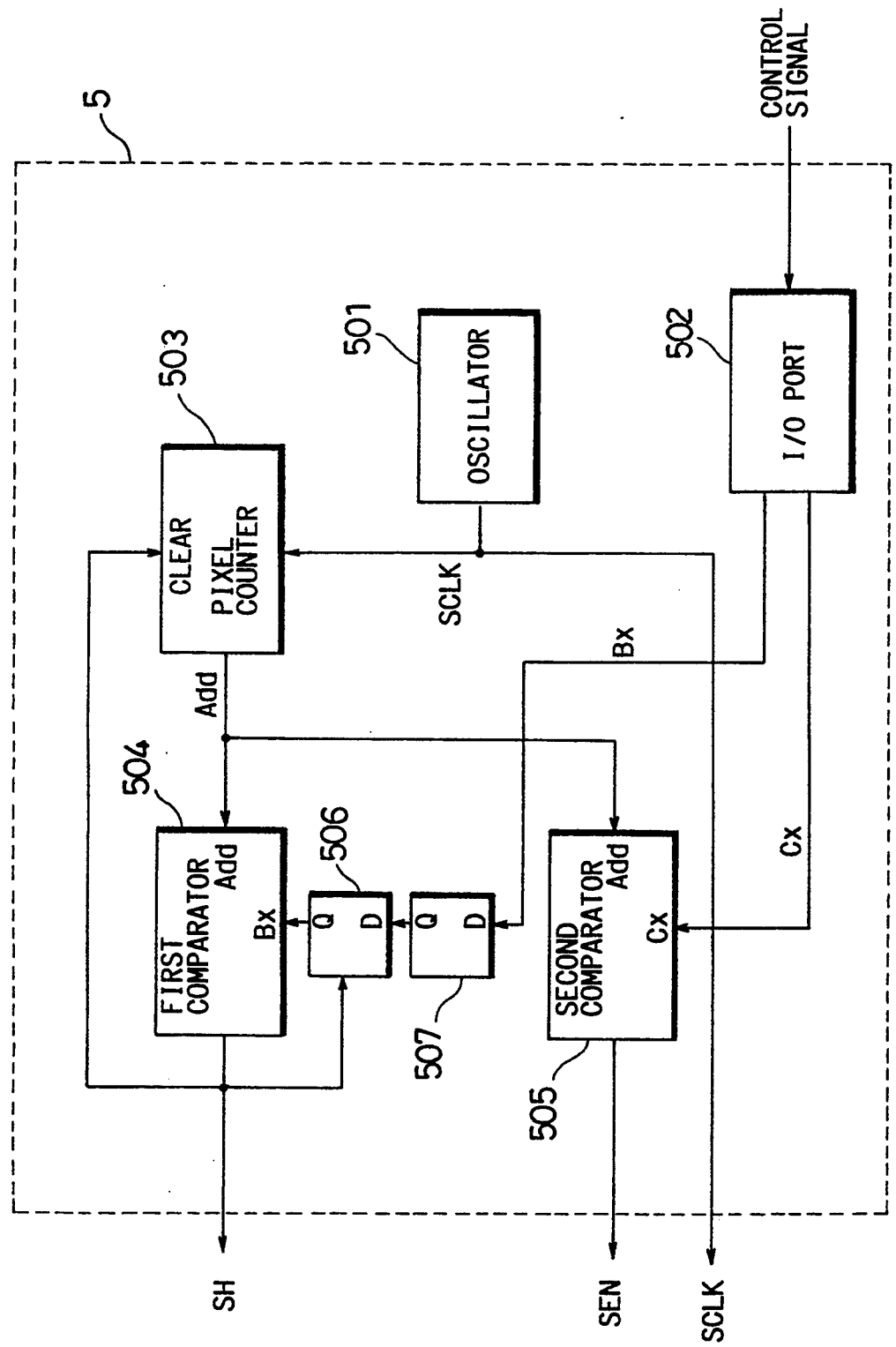
FIG. 2 is a block diagram showing the function of the sensor driving circuit 5 of FIG. 1.
Figure 3:
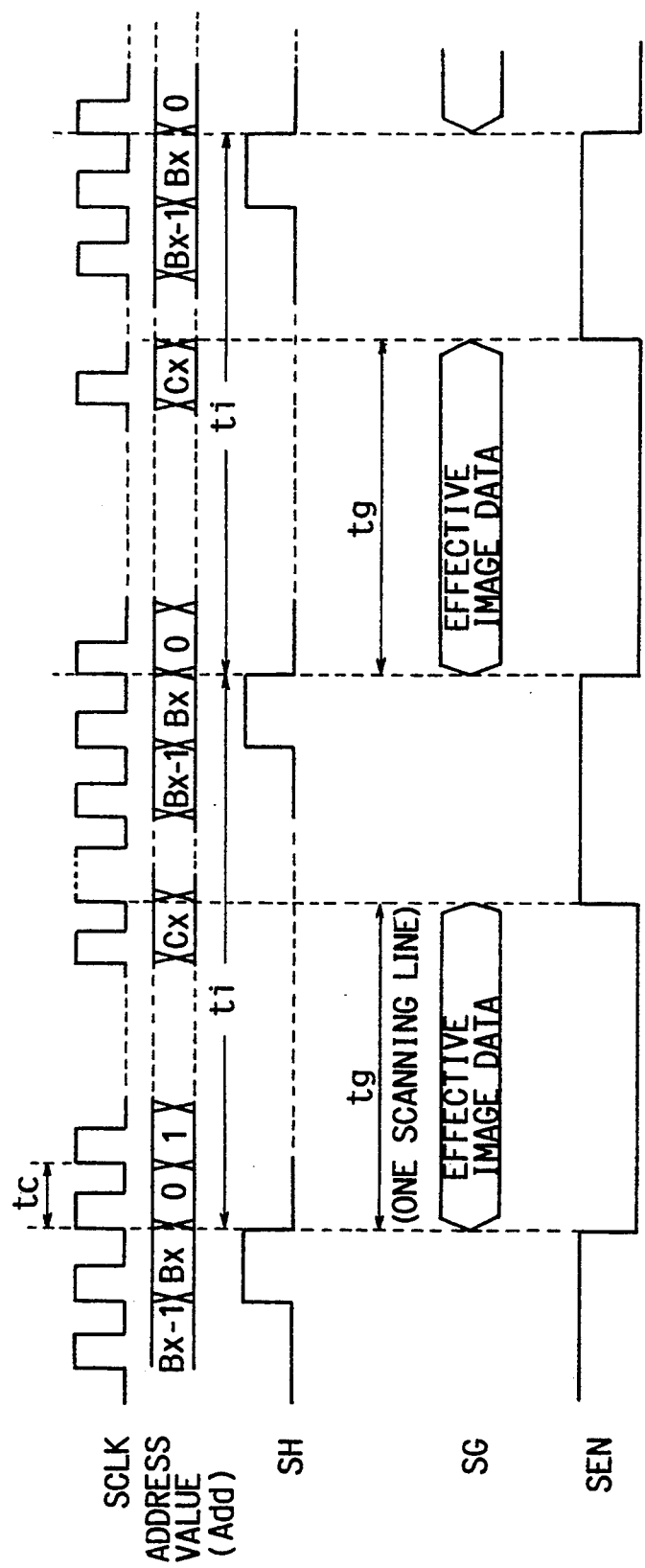
FIG. 3 is a timing chart of the operation of the sensor driving circuit 5.

FIG. 2 is a block diagram showing the function of the sensor driving circuit 5 of FIG. 1. FIG. 3 is a timing chart of the operation of the sensor driving circuit 5.

In FIG. 2, an oscillator 501 generates the pixel clock SCLK at a constant repetition rate whilst a pixel counter 503 counts the number of the pixel clocks SCLK and releases a count address value Add. The CPU 110 of the controller 11 sets periodic pixel number Bx, which determines the pulse interval of the transfer pulse SH, in a first comparator 504 and effective pixel number Cx of image data in a second comparator 505, by way of an I/O port 502. The first comparator 504 compares the count address value Add from the pixel counter 503 with the preset pixel number Bx and issues the transfer pulse SH of high level when Add=Bx. The fall of the transfer pulse SH causes the pixel counter 503 to clear the count address value Add to 0. The second comparator 505 compares the count address value Add with the effective pixel number Cx and issues the image effective signal SEN of a low level when $0 = < \text{Add} = < Cx$ and the image effective signal SEN of high level when $Cx < \text{Add}$. The pulse interval ti (s) of the transfer pulse SH and an effective image data time period tg (s) can be calculated from the following equations [Exp. 1] and [Exp. 2] respectively.

$$ti = (Bx+1) \times tc \ (s) \qquad \text{[Exp. 1]}$$

$$tg = (Cx+1) \times tc \ (s) \qquad \text{[Exp. 2]}$$

where tc is the pulse interval (s) of the pixel clock SCLK; Bx is the periodic pixel number; and Cx is the effective pixel number.

In consequence, the CPU 110 of the controller 11 can vary the pulse interval ti of the transfer pulse SH and the time period tg of the image effective signal SEN by setting the periodic pixel number Bx and the effective pixel number Cx to desired values. When the periodic pixel number Bx is set to a desired value, it is latched in a latch 507. The set value Bx is released to the first comparator 504 when the fall of the transfer pulse SH actuates the latch 506.

The pulse interval ti of the transfer pulse SH corresponds to the storage time of light signals from the line sensor 1. Therefore, the pulse interval ti is required to be varied according to the read-scanning speed of the line sensor 1 in order to make the resolution for reading in the sub-scanning direction constant. The pulse interval ti is required to be set based on the equation [Exp. 3].

$$ti = 1/(Y \times Vx) \ (s) \qquad \text{[Exp. 3]}$$

where Vx is the read scanning speed (mm/s) and Y is the sub-scanning resolution (dot/mm).

Therefore, the minimum value Tmin and maximum value Tmax of the pulse interval ti are calculated from the equations [Exp. 4] and [Exp. 5] respectively.

$$Tmin = 1/(Y \times Vmax) \ (s) \qquad \text{[Exp. 4]}$$

$$Tmax = 1/(Y \times Vmin) \ (s) \qquad \text{[Exp. 5]}$$

where Vmax is the maximum value of the read scanning speed (mm/s); Vmin is the minimum value of the same (mm/s); and Y is the sub-scan resolution (dot/mm).

In order to release all effective image data in the period of the varying pulse interval ti, it is required to satisfy tg<ti. The pulse interval tc of the pixel clock SCLK is set so as to satisfy the inequality [Exp. 6].

$$tc < Tmin/(Cx+1) \ (s) \qquad \text{[Exp. 6]}$$

where Tmin is the minimum value of the pulse interval ti and Cx is the effective pixel number.

In order to vary the pulse interval ti of the transfer pulse SH up to Tmax provided that the pulse interval tc satisfies the inequality [Exp. 6], the pixel counter 503, the first comparator 504 and the second comparator 505 count and compare the address values Add up to [Tmax/tc]+1. It is to be understood that [Tmax/tc] is round-down processing in which decimal fractions are rounded down.

With the sensor driving circuit 5 as described above, the pulse interval ti of the transfer pulse SH can be varied from Tmin to Tmax with the accuracy of the pulse interval tc. Hence, the read-scanning speed of the line sensor 1 can be varied within the range from the maximum value Vmax to the minimum value Vmin (mm/s) with the sub-scanning resolution maintained at Y (dot/mm).

The maximum value Vmax (mm/s) and minimum value Vmin (mm/s) of the scanning speed; the sub-scanning resolution Y (dot/mm); the pulse interval tc (s); and the effective pixel number Cx that is set according to the size of an original document are values determined by the design specification. The design values of Vmax, Vmin, Y, tc, Cx are stored in the read only memory 112 (hereinafter referred to as ROM 112) provided in the controller 11.

The transfer pulse SH, the pixel clock SCLK and the image effective signal SEN that are synchronous with the transfer pulse SH are sent to the line sensor 1, the controller 11 and the sampling circuit 19 respectively.

The pulse interval tc of the oscillator 501 is a fixed time interval in the above description, but may be changed so as to vary the pulse interval ti. In this case, a plurality of oscillators may be employed or alternatively the interval of the output of a single oscillator may be varied by setting.

Figure 4:
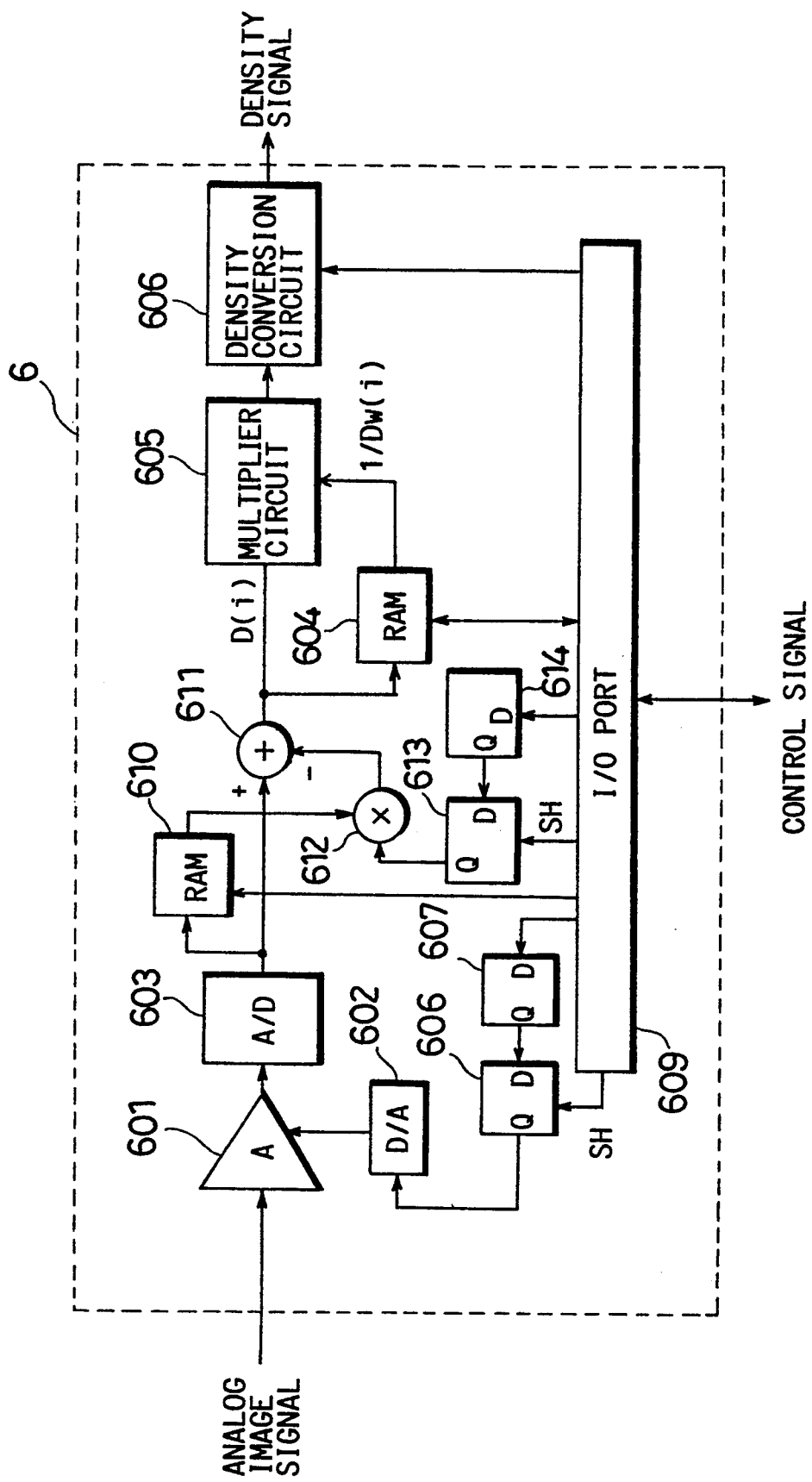
FIG. 4 is a block diagram showing the function of the signal processing circuit 6 of FIG. 1.
Figure 5:
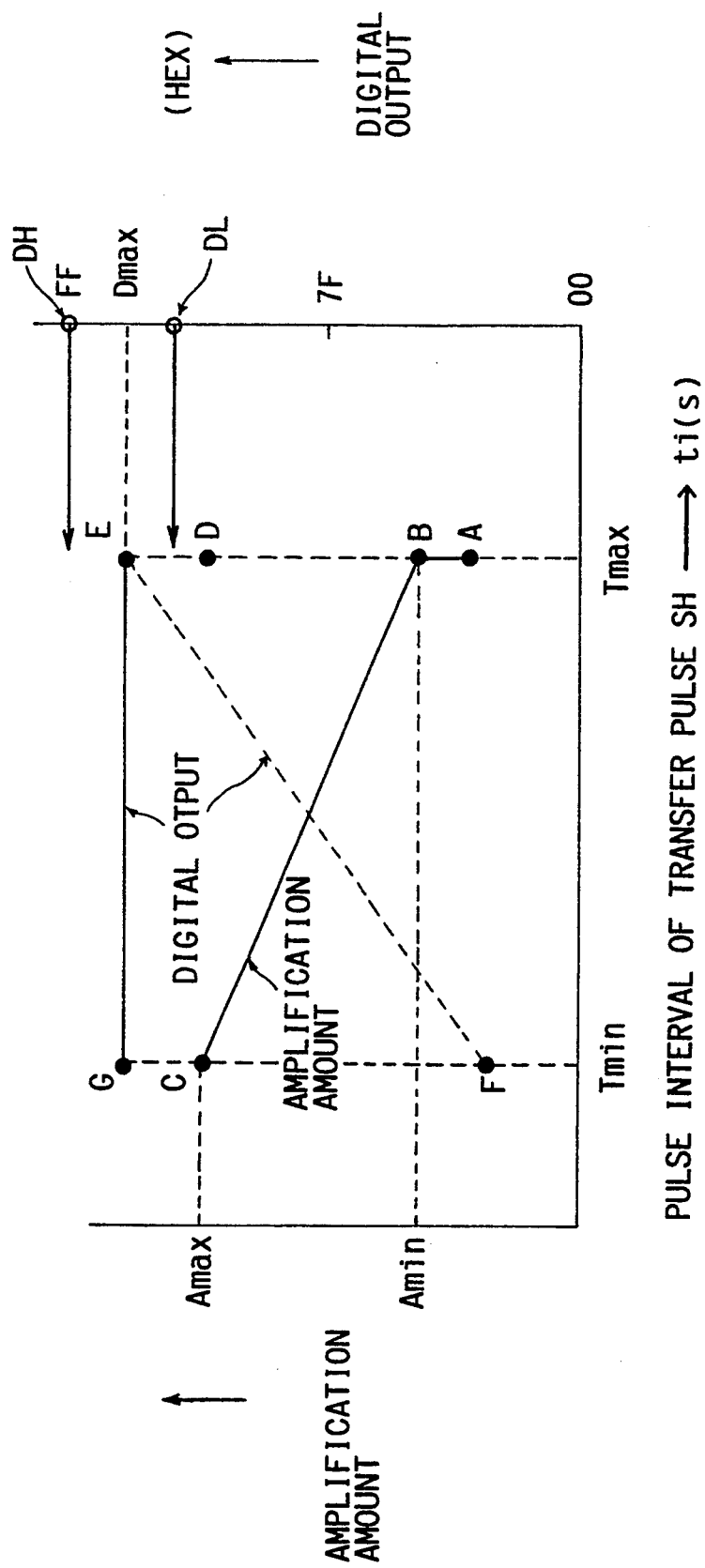
FIG. 5 is a diagram showing the relationship between a digital signal output before white level correction and the amplification amount of an analog signal amplifier.
Figure 6:
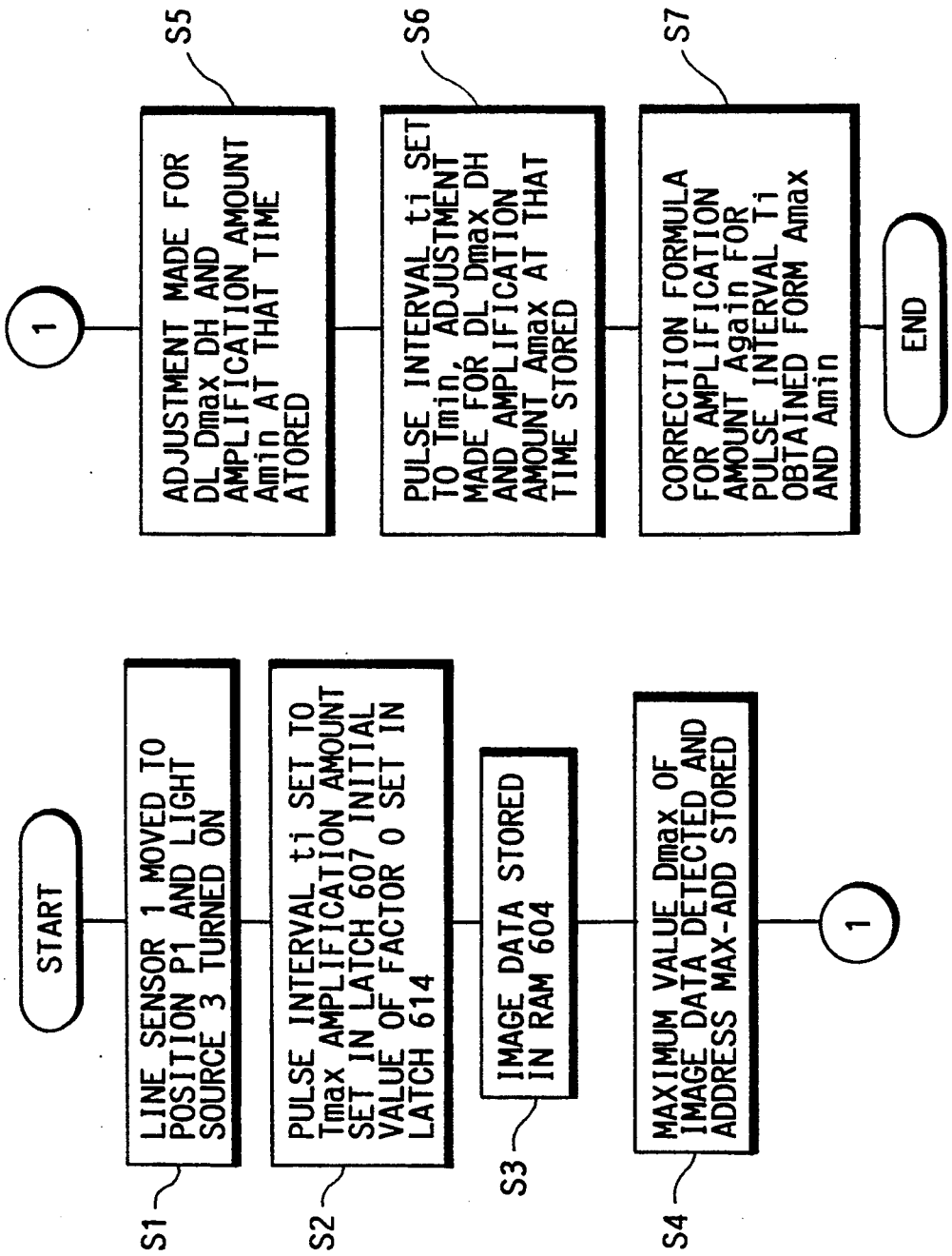
FIG. 6 is a flow chart of amplification amount correction.

FIG. 4 shows in block form the function of the signal processing circuit 6 of FIG. 1. FIG. 5 shows the relationship between a digital signal output before white level correction and the amplification amount of an analog signal amplifier. FIG. 6 shows the flow of amplification amount correction.

The signal processing circuit 6 performs three correcting operations. Specifically, amplification amount correction, black level correction and white level correction are carried out in this order.

First of all, the amplification amount correction will be explained.

As shown in FIG. 5, when the pulse interval ti of the transfer pulse SH released to the line sensor 1 is varied from Tmax to Tmin, the digital signal output varies from Point E to Point F in the case that the amplification amount of an analog amplifier 601 is fixed. This is because although the exposure amount of the line sensor 1 is constant, the storage time of light signals from the line sensor 1 is shortened by shortening the pulse interval ti of the transfer pulse SH with the result that the output signal of the line sensor 1 becomes small. When the output value of the analog amplifier 601 decreases, there arises a problem that distortion occurs in quantizing an analog image signal to a digital signal by means of an A/D convertor 603. Therefore, the amplification amount of the analog amplifier 601 is increased from Point B to Point C as the pulse interval ti is shortened, thereby correcting the input signal of the A/D convertor 603 to be a reference value or more. As a result, the digital signal output varies from Point E to Point G. By performing such an amplification amount correction, quantization of analog signals can be performed with high precision even when the pulse interval ti varies. The correction value for the amplification amount can be obtained in such a way that a correction formula is obtained from amplification values at Points B and C and interpolating arithmetic processing is performed to obtain an amplification value corresponding to the pulse interval ti.

Referring now to the flowchart of FIG. 6, the amplification amount correction will hereinafter be explained.

(1) In the amplification amount correction, the motor controlling circuit 10 controls the operation of the motor 8a according to a control signal from the controller 11 to allow the line sensor 1 to move to the position P1 of the reference white plate 16 for level correction and to stop thereat. It also turns the light source 3 ON. (Step S1)

(2) The controller 11 initially sets the pulse interval ti of the transfer pulse SH to Tmax. The CPU 110 within the controller 11 reads out the pulse interval tc from the ROM 112 and calculates the periodic pixel number Bx corresponding to Tmax from the equation [Exp. 1]. The pulse interval ti is set to Tmax by setting Bx in the latch 507. An initial value for the amplification amount (Point A) is set in a latch 607 by way of an I/O port 609 and a factor K=0 is set in a latch 614. The data in the latch 607 is released to a D/A convertor 602 when the fall of the transfer pulse SH actuates the latch 608 whilst the data in the latch 614 is released to a multiplier 612 when the fall of the transfer pulse SH actuates the latch 613. Hence the output of the multiplier 612 becomes 0 and therefore no value is added to the output of a random access memory circuit 610 (hereinafter referred to as RAM 610) at an adder 611. As a result, the output of the A/D convertor 603 is supplied to a multiplier circuit 605 as an input value. The amplifier 601 is a variable amplifier of the voltage-control type. (Step S2).

(3) After the initial setting has been completed, an analog image signal issued from the line sensor 1 is amplified by the amplifier 601, and the analog signal is converted, by means of the 8-bit A/D convertor 603, from 00 (HEX) into a digital signal of FF (HEX). In response to a control signal sent from the controller 11 via the I/O port 609, the random access memory 604 (hereinafter referred to as RAM 604) once stores image data of one scanning line. The RAM 604 is capable of storing image data of one scanning line and has a main scan pixel counter. (Step S3)

(4) The image data of one scanning line stored in the RAM 604 are read out pixel by pixel in response to a control signal sent through the I/O port 609 from the CPU 110 of the controller 11. The read-out data are compared with one another. Through the comparison processing, the maximum value Dmax (Point D) of the image data is detected and an address (MAX-ADD) of the maximum value stored in the RAM 604 is stored in the internal RAM 111 of the controller 11. (Step S4)

(5) The controller 11 increases/decreases the set value for the latch 607 until the output value Dmax (Point E) of the A/D convertor 603 falls within the reference range i.e., DL= <Dmax<DH. The values DL and DH are experimentally obtainable. The reference image data output from the A/D convertor 603 are image data stored at the address (MAX-ADD) of the RAM 604, the address (MAX-ADD) having been stored in the internal RAM 111 at Step S4. The amplification amount at Point B when the output (Point D) of the A/D convertor 603 is corrected to be the value at Point E (which is within the reference range) is stored as a set value in the internal RAM 111 of the controller 11. The fall of the transfer pulse SH causes the CPU 110 of the controller 11 to execute interrupt processing, and in the course of the interruption, a data value of the amplification amount is set in the latch 607. After the completion of the setting of the data, the controller 11 issues a control signal for storing image data of one scanning line in the RAM 604. One pulse cycle of the transfer pulse SH, i.e., the pulse interval ti is necessary in order to store image data of one scanning line in the RAM 604, and therefore the CPU 110 reads out the reference image data in the second interruption cycle succeeding the completion of the data setting. The interruption processing routine is terminated at the time the output (Point D) of the A/D convertor 603 becomes the value at Point E within the reference range. (Step S5)

(6) The controller 11 sets the pulse interval ti of the transfer pulse SH to Tmin. The CPU 110 reads out the pulse interval tc from the ROM 112 and obtains, from the equation [Exp. 1], the periodic pixel number Bx corresponding to Tmin. The pulse interval ti is set to Tmin by setting Bx in the latch 507. The set value for the latch 607 is increased/decreased until the output value Dmax (Point F) of the A/D convertor 603 falls within the reference range i.e., DL= <Dmax<DH. The values DL and DH are experimentally obtainable. The reference image data output from the A/D convertor 603 are image data stored at the address (MAX-ADD) of the RAM 604, the address (MAX-ADD) having been stored in the internal RAM 111 at Step S4. A set value (Amax) of the amplification amount at Point C when the output (Point F) of the A/D convertor 603 becomes the value at Point G that is within the reference range is stored in the internal RAM 111 of the controller 11. Setting of data for amplification amount and reading-out of the reference image data are performed in the similar manner to that of Step S5. (Step S6)

(7) From the amplification values Amax and Amin that have been stored in the internal RAM 111 at Steps S5 and S6, the CPU 110 obtains a correction formula for computing an amplification value Again corresponding to the variation of the pulse interval ti of the transfer pulse SH. The correction formula is shown in [Exp. 7]. (Step S7)

$$Again = (Amax - Amin)/(Tmin - Tmax) \times (ti - Tmin) + Amax \quad [Exp. 7]$$

With the amplification amount correction described above, the correction formula [Exp. 7] for computing the amplification value Again in the case of the pulse interval ti varying from Tmin to Tmax is obtained and this correction formula [Exp. 7] is stored in the internal RAM 111 of the controller 11. During read-scan of an original document, after the setting of the pulse interval ti by setting the periodic pixel number Bx in the latch 507, the interpolating arithmetic processing is performed on the amplification value Again and then the amplification value Again is set in the latch 607.

With the above operation, high-precision quantization of analog signals can be achieved even when the pulse interval ti varies from Tmin to Tmax.

Now, the black level correction will be explained. The black level correction is carried out after completion of the amplification amount correction.

The controller 11 turns the light source 3 OFF and sets the pulse interval ti of the transfer pulse SH to Tmax. The CPU 110 reads out the pulse interval tc from the ROM 112 and computes from the equation [Exp. 1] the periodic pixel number Bx that corresponds to Tmax. The pulse interval ti is set to Tmax by setting Bx in the latch 507. The amplification value Amin that has been stored in the RAM 111 is set in the latch 607 by way of the I/O port 609. The data in the latch 607 is released to the D/A convertor 602 when the fall of the transfer pulse SH actuates the latch 608.

An analog image signal from the line sensor 1 is amplified by the amplifier 601 and the analog signal is converted from 00(HEX) into a digital signal of FF(HEX) by means of the 8-bit A/D convertor 603. In response to a control signal that has been fed through the I/O port 609 from the controller 11, image data of one scanning line are stored in the RAM 610. The CPU 110 of the controller 11 inputs a temperature TBs (°C.) from the temperature detection sensor 20 and allows the RAM 111 to store it, the temperature TBs being at the time of the black level correction. As a result, correction value data Dk(i) for the black level of each pixel when the light source 3 is turned OFF are stored in the RAM 610. Hence a factor K is set in the latch 614. The data in the latch 614 is released to the multiplier 612 when the fall of the transfer pulse SH actuates the latch 613. The correction value for the black level stored in the RAM 610 is multiplied by K by means of the multiplier 612 and then released to the adder 611.

At the time of reading of the original document 13, operation for subtracting the black level correction data multiplied by K (i.e., K×Dk (i)) from the image data D(i) (the output data of the A/D convertor 603) obtained from the read-scan of the original document 13 is performed. This operation is represented by: Output Dout=D(i)−K×Dk (i).

(Black Level Correction)

If the pulse interval ti is changed, the CPU 110 of the controller 11 corrects, in conformity to the amplification value Again, the factor K such that K=Again/Amin. During the read-scan, after the completion of the setting of the pulse interval ti, the amplification value Again is obtained from the correction formula [Exp. 7], and the factor K is computed from K=Again/Amin to be set in the latch 614.

With the above operation, high-precision black level correction can be achieved even if the pulse interval ti varies from Tmin to Tmax and the amplification amount is varied from Amin to Amax, to comply with the variation of the pulse interval ti.

The distortion of a black level is caused by a dark current mainly generated at a photodiode, storage electrode or CCD shift register. Dark current is highly affected by temperature. The CPU 110 of the controller 11 therefore performs the following operation: Assuming that the temperature at the time of black level correction stored in the RAM 111 is TBs (°C.) and the temperature newly detected by the controller 11 using the temperature detection sensor 20 is TBst (°C.), comparison is made between TBst and TBs. When TBst>TBs holds, a factor Kx is obtained from Kx=α×(TBst −TBs) ×K where α denotes the rate of temperature change (times/° C.). Then, a correction is made in the factor K for setting the factor Kx in the latch 614. The rate α is an experimentally obtainable value and stored in the ROM 112.

The correction of the factor K for setting the factor Kx eliminates the need for the relocation of the line sensor 1, the relocation being necessary for black level correction when the temperature varies. That is to say, it is no longer necessary to move the line sensor 1 to the shading position P1 even in continuous read-scan. As a result, high-speed continuous read-scan can be achieved. Further, even if the temperature of the whole body of the line sensor 1 varies, black level correction can be achieved with high accuracy.

Next, the white level correction will be described. The white level correction is performed after the amplification amount correction and black level correction have been completed. The controller 11 turns the light source 3 ON and sets the pulse interval ti of the transfer pulse SH to Tmax. The CPU 110 reads out the pulse interval tc from the ROM 112 and computes from [Exp. 1] the periodic pixel number Bx which corresponds to Tmax. The pulse interval ti is set to Tmax by setting Bx in the latch 507. The controller 11 also reads out the amplification value Amin from the RAM 111, and sets the value Amin in the latch 607 and the factor K=1 in the latch 614 by way of the I/O port 609. The data in the latch 607 is released to the D/A convertor 602 when the fall of the transfer pulse SH actuates the latch 608 whilst the data in the latch 614 is released to the multiplier 612 when the fall of the transfer pulse SH actuates the latch 614. By setting the factor K=1 in the latch 614, the output of the multiplier 612 becomes equal to that of the RAM 610. The adder 611 obtains a value by subtracting the output of the multiplier 612 from the output of the A/D convertor 603 and sends it to the multiplier circuit 605. The amplifier 601 amplifies an analog image signal supplied from the line sensor 1, and the 8-bit A/D convertor 603 converts the analog signal from 00(HEX) to a digital signal of FF(HEX). In response to a control signal that has been fed through the I/O port 609 from the controller 11, image data of one scanning line are once stored in the RAM 604. The CPU 110 of the controller 11 reads the stored data from the RAM 604 pixel by pixel by way of the I/O port 609. The inverse number of the pixel data is obtained by calculation and stored at the same address. Such an operation is performed on the image data of every scanning line.

In consequence, correction value data 1/Dw (i) for each pixel when reading the reference white plate 16 are stored in the RAM 604. During reading operation, the output Dour (HEX)=D(i)×FF (HEX)/Dw(i) is calculated at the multiplier circuit 605 based on the image data D(i) (the output data of the adder 611) obtained by read-scan of the original document 13 and based on the correction value 1/Dw (i) stored in the RAM 604. (white level correction)

The above signal correction enables it to correct the uneven luminous amounts of the light source 3 and the uneven sensitivities of the light receiving elements disposed in the line sensor 1. A density conversion circuit 606 converts a reflectance-wise linear image signal supplied from the multiplier circuit 605 into a density-wise linear image signal to release. After the completion of the white level correction, the motor control circuit 10 controls the operation of the motor 8a in accordance with a control signal from the controller 11 so that the line sensor 1 returns from the position P1 of the reference white plate 16 to the starting position and stops thereat. The controller 11 also turns the light source 3 OFF.

Figure 7:
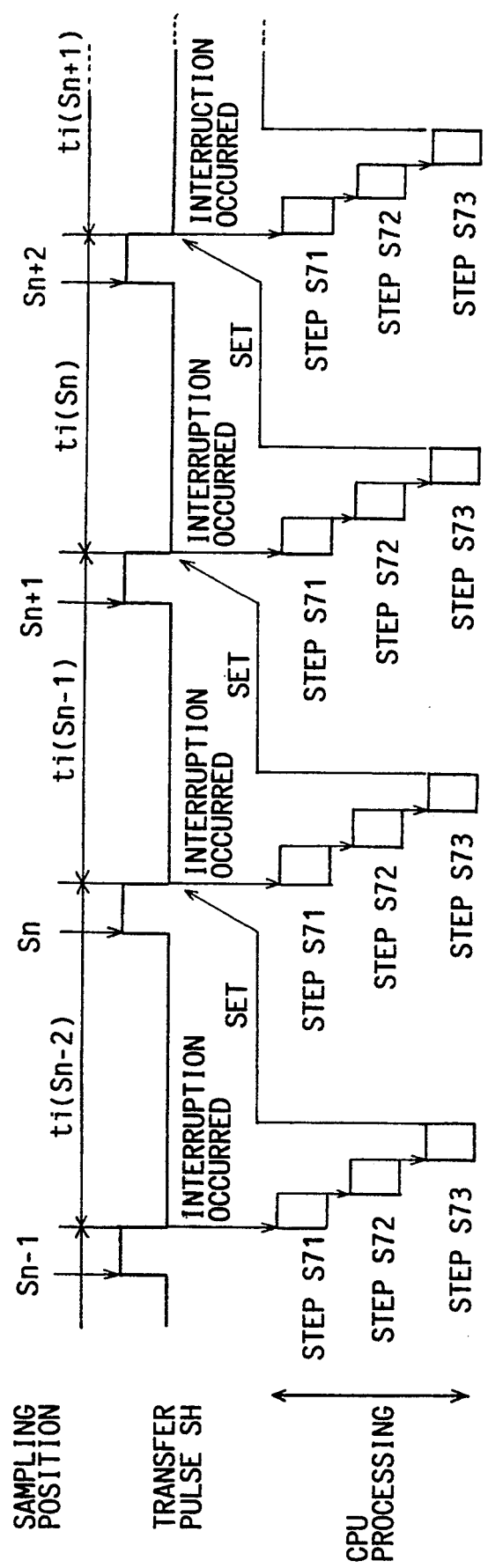
FIG. 7 is a timing chart of read-scanning speed correction.
Figure 8:
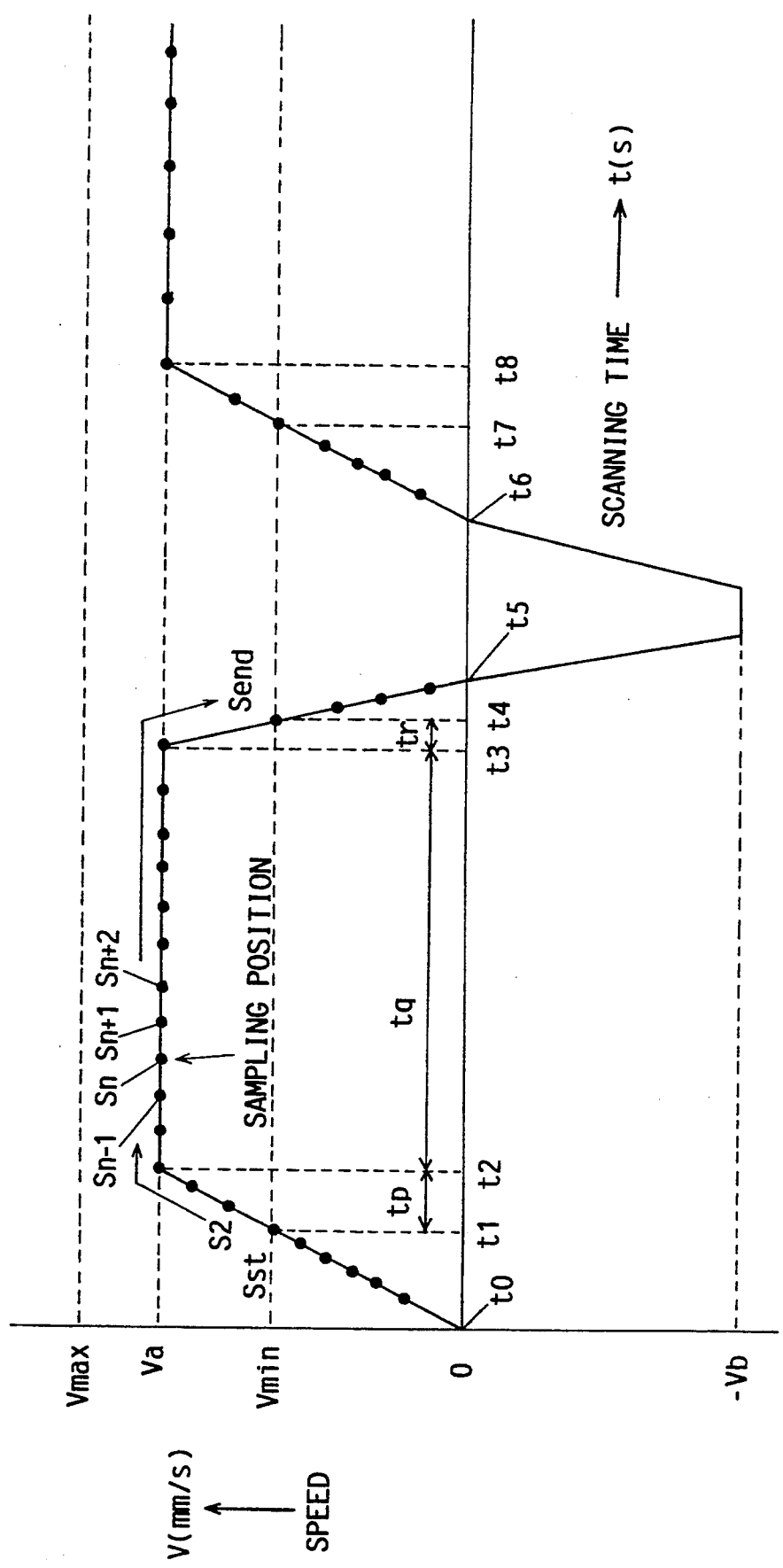
FIG. 8 is a diagram illustrating the speed profile in the case of 100% magnification read-scan and its correction.

Reference is now made to FIGS. 7 and 8 for describing an embodiment in which the image reader of the invention performs 100%-magnification read-scan.

FIG. 7 is a timing chart for correction performed on the read-scanning speed. The speed detection circuit 18 (see FIG. 1) counts, by the use of an internal clock, the pulse intervals of encoder pulses released from the sensor 8 to generate a speed signal V having a digital value. The sampling circuit 19 is actuated by the rise of the transfer pulse SH to sample the speed signal V. The CPU 110 of the controller 11 is actuated by the fall of the transfer pulse SH to execute the interrupt processing of Steps S71, S72 and S73. The following is the explanation for the interrupt processing.

Step S71

The CPU 110 of the controller 11 reads a speed signal Vs from the sampling circuit 19 and computes the optimum value for the pulse interval ti from the speed signal Vs using the equation [Exp. 3]. The pulse interval ti is obtained from the following equation [Exp. 8].

$$ti = 1/(Y \times Vs) \, (s) \qquad [\text{Exp. 8}]$$

where Vs is the read signal (mm/s) and Y is the sub-scanning resolution (dot/mm) of the image reader.

Thereafter, the CPU 110 reads out the maximum value Vmax, the minimum value Vmin and the sub-scanning resolution Y from the ROM 112, and calculates Tmin and Tmax from the equations [Exp. 4] and [Exp. 5]. After the completion of the calculations, a judgment is performed as to whether or not the pulse interval ti obtained from the equation [Exp. 8] satisfies the condition Tmin= <ti= <Tmax. If the condition holds, the pulse interval ti is stored in the RAM 111 and the program proceeds to Step S72. If not, the interruption processing is terminated.

Step S72

The CPU 110 reads out the pulse interval tc from the ROM 112 and the pulse interval ti from the RAM 111. It also computes the periodic pixel number Bx from the equation [Exp. 9] and allows the RAM 111 to store it. It is to be understood that [ti/tc] in [Exp. 9] is round-down processing in which decimal fractions are rounded down.

$$Bx = [ti/tc] - 1 \qquad [\text{Exp. 9}]$$

Then, the amplification amount Again is computed from the equation [Exp. 7] and a set amplification value Ax is obtained to be stored in the RAM 111.

The CPU 110 newly detects the output of the temperature detection sensor 20 by way of the I/O port 113, and compares the detected temperature TBst (°C.) and the temperature TBs (°C.) stored in the RAM 111, the temperature TBs being obtained at the time of black level correction. If TBst= <TBs, the factor K is calculated from K=Again/Amin. Assuming that Kst=K, the factor Kst is stored in the RAM 111. If TBst>TBs, the factor Kx is obtained from Kx=α×(TBst−TBs)×K where α represents the rate of temperature change (times/° C.). Assuming that Kst=Kx, the factor Kst is stored in the RAM 111. The rate α is an experimentally obtainable value and stored in the ROM 112.

Step S73

The periodic pixel number Bx that has been stored in the RAM 111 at Step S72 is set in the latch 507 of the sensor driving circuit 5. The amplification value Ax is set in the latch 607 in the signal processing circuit 6 whilst the factor Kst is set in the latch 614. The fall of the transfer pulse SH causes the latch 608 to release the amplification value Ax to the D/A convertor 602, thereby setting an amplification amount value for the amplifier 601. The fall of the transfer pulse SH causes the latch 506 to release the periodic pixel number Bx to the first comparator circuit 504, thereby setting the pulse interval ti. The fall of the transfer pulse SH causes the latch 613 to release the factor Kst to the multiplier 612, and a correction value for black level correction sent from the RAM 610 is multiplied by Kst at the multiplier 612 and then released to the adder 611. The adder 611 subtracts the output of the multiplier 612 from the image data.

The above-described interrupt processing enables the pulse interval ti, the amplification amount Again and the factor Kst to be set, these values corresponding to the read-scanning speed of the image reader, although the setting is delayed one cycle of the transfer pulse SH.

Consequently, read-scan of the original document 13 can be performed with the constant resolution Y (dot/mm), and high-precision quantization of analog signals and high-precision black level correction can be achieved, even if the read-scanning speed of the image reader varies.

FIG. 8 shows the speed profile of 100% magnification read-scan and its correction. In FIG. 8, the period from t0 to t2 is an acceleration scanning period; the period from t2 to t3 is a fixed speed scanning period in which scanning is carried out at a speed of Va (mm/s); and the period from t3 to t5 is a deceleration scanning period. In the period from t5 to t6, the line sensor 1 returns from the trailing edge P3 of the original document 13 to the starting position preceding the leading edge P2. The maximum of the return speed is −Vb (mm/s).

In the period from t0 to t6, a first cycle of read-scan is completed. The period from t6 to t8 is a second acceleration scanning period and after that, scanning operation is carried out with the same speed profile as that of the period from t2 to t6. After the time point t1 at which the read-scanning speed V becomes Vmin (mm/s) by executing the interrupt processing of steps S71 to S73 in the document scanning region, the image reader performs the correction of the pulse interval ti of the transfer pulse SH, amplification amount correction and black level correction (i.e., setting of the periodic pixel number Bx, amplification value Ax and factor Kst) in accordance with the speed sampling value Vs (mm/s). The setting of the periodic pixel number Bx, amplification value Ax and factor Kst is repeatedly carried out until the time point t4 at which the read-scanning speed V becomes Vmin (mm/s) again in the deceleration speed region.

As a result, the original document 13 can be scanned with the constant resolution Y (dot/mm), and high-precision quantization of analog signals and high-precision black level correction can be achieved.

In marked contrast to a conventional image reader in which read-scan operation of an original document 13 is only performed within the fixed speed scanning period tq in which scan is carried out at a constant speed Va (mm/s), the image reader of the invention enables read-scan performed during an acceleration scanning period tp (from t1 to t2) and a deceleration scanning period tr (from t3 to t4). Further, the image reader of the invention enables it to save a read-scanning time period tx within the time periods tp and tr when repeatedly performing read-scan operation. The time period tx to be saved is given by the following equation.

$$tx = (tp + tr)/2 \times (1 + Vmin/Va) \text{ (s)} \qquad [\text{Exp. 10}]$$

where Va is the fixed speed (mm/s) and Vmin is the minimum value of the read-scanning speed (mm/s).

The operation up to the time point t8 in the second scanning operation will be explained. The time period tx can be saved by using part of the period from t3 to t8, that is, the period from t3 to t4 and the period from t7 to t8 for reading. This makes it possible to save the time tx per one cycle of read-scan and to provide, as a result, an image reader capable of performing high-speed reciprocating reading operation.

Reference is now to made to FIGS. 8 and 9 for describing an embodiment of copying operation in which the image reader of the invention having a buffer memory 7 is connected to an output device which performs recording operation by raster scan at the constant speed Va (mm/s).

FIG. 9 shows the operation of the buffer memory 7. In FIG. 9, in response to a control signal that has been fed through an I/O port 703 from the controller 11, a memory control circuit 702 allows a memory 701 to sequentially store input image data by scanning line. The image data thus stored are sequentially released by scanning line in such a way that the first item stored is released first. In order to perform the above input/output operations, the memory 701 is designed as a buffer memory of the first-in first-out type (hereinafter referred to as FIFO) provided with a dual port where writing and reading can be carried out in an overlapping manner. The 25 memory 701 sequentially stores image data items from each scanning line during the time the image effective signal SEN released from the memory control circuit 702 is low. The number of image data items to be stored in the memory 701 from one scanning line is given by Cx+1 where Cx represents the effective pixel number set in the second comparator 505 of the sensor driving circuit 5.

The effective pixel number Cx is determined according to the size of a document to be copied, the size being set through the copy document selecting section 17. The CPU 110 computes the effective pixel number Cx from $Cx = [X \times Sx - 1]$ where Sx is the size (mm) of a document in a main scanning direction and X is the resolution (dot/mm) for main scan, and sets it in the second comparator 505. It is to be noted that $[X \times Sx - 1]$ is round-down processing in which decimal fractions are rounded down.

A time period tm is set such that when the acceleration scanning period $tp > =$ the deceleration scanning period tr, tm=tr holds and that when tp<tr, tm=tr holds. The controller 11 allows the buffer memory 7 to sequentially store image data items from scanning lines that are read-scanned during the time period tm. The number of scanning lines Lx to be read during the time period tm is given by the following equation [Exp. 11].

$$Lx = [tm \times Y/2 \times (Va + Vmin)] + 1 \text{ (line)} \qquad [\text{Exp. 11}]$$

where Y is the resolution (dot/mm), Va is the fixed speed (mm/s) and Vmin is the minimum value of the read-scanning speed (mm/s). It should be noted that $[tm \times Y/2 \times (Va + Vmin)]$ is round-down processing in which decimal fractions are rounded down.

In the case that the aforesaid output device is the printer 14 for example, the controller 11 allows, in synchronism with VSYNC from the printer 14, the buffer memory 6 to store image data items up to the number Lx of scanning lines. Then the controller 11 allows, in synchronism with HSYNC and PCLK from the printer 14, the buffer memory 6 to sequentially release the image items in the order in which they were stored, i.e., starting from the first stored scanning line. Since the read-scanning speed and the write-scanning speed are Va (mm/s), the number of scanning lines to be stored in the acceleration period from t1 to t2 and the deceleration period from t3 to t4 varies in the range from 1 to Lx. In the case of read-scan repeatedly performed, read-scanning time during the time periods tp and tr is reduced. That is, the time tx given by the equation [Exp. 10] can be saved.

As has been mentioned above, a device in which recording is performed by raster scan at the constant speed Va (mm/s) can be connected to the image reader of the invention by sequentially storing image data in the buffer memory 7 during the acceleration period and sequentially releasing them during the fixed speed period or the deceleration period. In the embodiment of the image reader according to the invention, the time tx (s) can be saved every reciprocating reading operation. With this arrangement, the speed at which continuous reciprocating reading operation is performed can be increased more than that of the conventional image reader in which images are read only during the fixed speed scanning period in which scan is carried out at the speed Va (mm/s).

The above-described image reader enables high-speed continuous copying operation by the use of a small-capacity memory.

Figure 10:
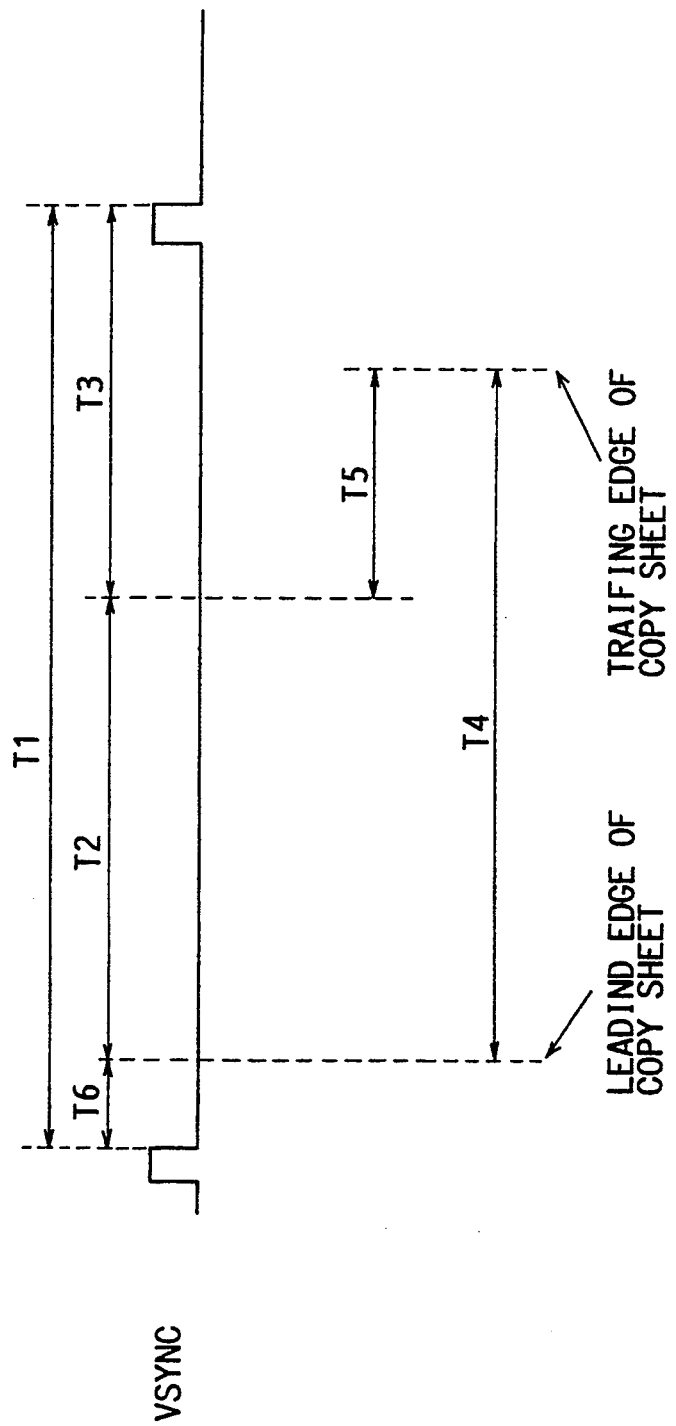
FIG. 10 is a timing chart of copying operation.
Figure 11:
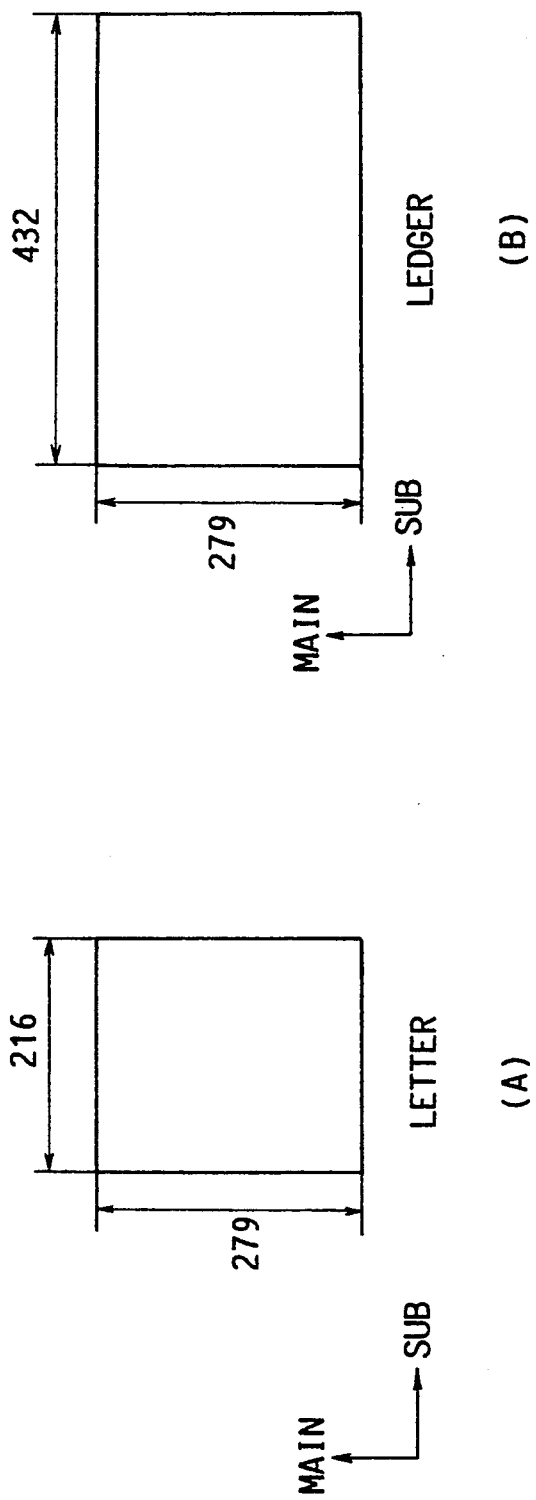
FIG. 11 is a diagram showing the sizes of original documents.

With reference now to FIGS. 9, 10 and 11, an embodiment of the image reproducing system will be explained.

FIG. 10 is a timing chart of the copying operation and FIG. 11 shows the sizes of original documents to be copied.

Reference is first made to FIG. 10 to explain one embodiment in which 100%-magnification copying is performed. T6 represents a time period from the fall of VSYNC issued from the printer 14 to the start of record-scanning which starts from the leading edge of a copy sheet. T1 represents a repetitive time period during which the printer 14 sub-scans the copy sheet for recording. T2 represents a time period during which the line sensor 1 read-scans the original document 13 from its leading edge to its trailing edge. T3 represents a time period during which the line sensor 1 returns from the trailing edge of the original document 13 to the leading edge of the same. T4 represents a time period during which the printer 14 records the image data on the copy sheet from its leading edge to its trailing edge by sub-scan. T5 represents the difference between the time period T2 during which the line sensor 1 read-scans the original document 13 from its leading edge to its trailing edge and the time period T4 during which the printer 14 records the image data on the copy sheet by sub-scan, namely, T5 is given by: T4−T2=T5 (T2<T4). The line sensor 1 does not carry out such operations as accelerated/decelerated scanning, halt and re-start in the course of its read-scanning operation. In other words, the line sensor 1 is controlled to be driven at a fixed scanning speed.

Since the read-scanning speed is set to be higher than the record-scanning speed, image data are sequentially stored in the buffer memory 7 and the storage amount of image data becomes maximum upon completion of reading of the original document 13. Specifically, the maximum amount of image data stored in the buffer memory 7 is obtained by deducting the amount of data that has been recorded by the printer 14 from the amount of data that has been read out by the line sensor 1. The maximum amount Mmax of data to be stored in the buffer memory 7 when image data read during the acceleration/deceleration periods are not stored is given by the equation [Exp. 12]. The maximum number Lm of scanning lines of images to be stored in the buffer memory 7 is given by the equation [Exp. 13].

$$Mmax = Sx \times X \times Sy \times Y \times N \times (1 - T2/T4) - Mp \times (1 - T2/T4) \text{ (bit)} \qquad [Exp. 12]$$

$$Lm = Sy \times Y \times (1 - T2/T4) \text{ (line)} \qquad [Exp. 13]$$

where X is the resolution of main-scan (dot/mm); Y is the resolution of sub-scan (dot/mm); Sx is the size (mm) of an original document in the main-scanning direction; Sy is the size (mm) of the original document in the sub-scanning direction; T2 is the time (s) required for image-read scan; T4 is the time (s) required for image-record scan; and N is the number of tones in one pixel (bit/pixel). X, Y, N and Sx and Sy for each copy size are design values to be stored in the ROM 112 (Mp is the amount of image data included in one page of document).

In the above embodiment, the buffer memory 7 does not store image data read-scanned during the acceleration period, and the read-scanning speed is designed to be higher than the record-scanning speed. Therefore, the controller 11 allows, in synchronism with the fall of VSYNC issued from the printer 14, the buffer memory 7 to sequentially store two lines of image data or more that have been scanned and then allows, in synchronism with HSYNC and PCLK from the printer 14, to sequentially release the stored image data, starting from the first stored scanning line. The record-scan by the printer 14 starts at the leading edge of a copy sheet. During the time period from the start of read-scan to its completion, the buffer memory 7 sequentially stores image data from one scanning line up to the maximum number Lm. During the period T5 after the completion of the read-scan, only the operation wherein the buffer memory 7 releases image data to the printer 14 is performed.

The amount of data to be stored in the buffer memory 7 can be obtained as follows. Assuming that the duration of the period T2 is set to be 0.8 times that of the period T4, the maximum amount of data to be stored in the buffer memory 7 is calculated from the equation [Exp. 12]. The ratio of the maximum amount to be stored in the buffer memory 7 and the amount Mp of the data included in one page is 0.2:1. On the other hand, the time required for the line sensor 1 to return from the trailing edge to the leading edge can be increased by T5. In the above case, the required time can by increased by $0.2 \times T4$.

It is appreciated that in the above embodiment, the return time required when the line sensor 1 is driven in a reciprocating manner (i.e., the time required for the line sensor 1 to return from the trailing edge P3 to the leading edge P2) can be made longer, and this eases the burden imposed on the motor 8a which drives the heavy carriage unit 4. Like the image reader, the printer 14 was previously required to perform high-speed scan in order to reserve time for the return operation at the time of normal read-scan, however the above arrangement allows the record-scanning speed to be lower than the scanning speed of the image reader by T5. Accordingly, the above embodiment not only enables the image reader to perform high-speed reciprocating operation but also eliminates the need for a printer capable of high-speed-record scan.

Consequently, it becomes feasible to achieve an image reproducing system capable of performing copying operation at a high speed by the use of a small-capacity memory. Further, since the duration of the time period T3 can be set longer, sufficient time can be reserved for the document replacement time (T3+T6). Such an image reproducing system ensures high-speed copying both in the case that one document is copied onto multiple sheets and in the case that a plurality of documents are copied onto multiple sheets.

Reference is made to FIGS. 10 and 11 for explaining an embodiment wherein a copy size is selected in the above-described image reproducing system.

FIG. 11 shows the sizes of original documents. In FIG. 11, (A) illustrates the orientation of a LETTER-size sheet and (B) illustrates that of a LEGDER-size sheet. "Main" represents the main scanning direction whilst "Sub" represents the sub scanning direction.

There will be explained Example (a) in which the scanning speed for image-reading is not varied according to document sizes.

Example (a)

First, there will be explained Case (A) wherein the LETTER-size is selected. For convenience of explanation, the time periods T1 to T6 (in FIG. 10) are provisionally set as follows: T1=1.5 (s); T2=0.8 (s); T3=0.6 (s); T4=1.0 (s); T5=0.2 (s); and T6=0.1 (s). With the above setting, 40 times of copying operations can be performed per second for a LETTER-size document. The maximum amount of data to be stored in the buffer memory 7 is 0.2×Mpa as obtained from the equation [Exp. 12] (Mpa is the amount of data included in one page of LETTER-size document). In this case, the read-scanning speed is 216/0.8=270 (mm/s) and the record-scanning speed is 216/1=216 (mm/s).

Next, there will be explained Case (B) wherein the LEDGER-size is selected under the condition the read-scanning speed is 270 (mm/s) and the record-scanning speed is 216 (mm/s). For performing 20 times of copying operations per second with a LEDGER-size document, the duration of each time period is set as follows : T1=3.0 (s); T2=1.6 (s); T3=1.3 (s); T4=2.0 (s); T5=0.4 (s); and T6=0.1 (s).

The maximum amount of data to be stored in the buffer memory 7 is obtained from the equation [Exp. 12], that is, 2×0.2×Mpa=0.4×Mpa (Mpa is the amount of data included in one page of LETTER-size document).

It is understood from the above description that the amount of data stored in the buffer memory 7 in the case of LEDGER is twice that of LETTER. This is because the amount of data included in one page of LEDGER-size document is twice that of one page of LETTER-size document as the size of the former in the sub-scanning direction is twice that of the latter.

As has been described in Example (a), the amount of data to be stored in the buffer memory 7 varies according to the size of an original document when the read-scanning speed and record-scanning speed are not altered according to the size of the original document. In the above example, when a LEDGER-size document is copied, the buffer memory 7 stores data twice as much as in the case of a LETTER-size document. Therefore, the controller 11 changes the read-scanning speed in accordance with a copy size selected by means of the copy document selecting section 17, thereby reducing the amount of data to be stored.

There will be explained Example (b) in which the read-scanning speed is varied according to the size of an original document.

Example (b)

Under the same condition as those of Case (B) of Example (a) where LEDGER is selected, each time period is set as follows: T1=3.0 (s); T2=1.8 (s); T3=1.1 (s); T4=2.0 (s); T5=0.2 (s); and T6=0.1 (s). With the above setting, 20 times of copying operations can be performed per second for a LEDGER-size document.

The maximum amount of data to be stored in the buffer memory 7 is obtained from the equation [Exp. 12], that is, 2×0.1×Mpa=0.2×Mpa (Mpa is the amount of data included in one page of LETTER-size document).

In this case, the read-scanning speed is 432/1.8=240 (mm/s) and the record-scanning speed is 216 (mm/s).

As has been described in Example (b), the amount of data to be stored in the buffer memory 7 can be reduced by changing the read-scanning speed according to the size of a document. Compared with copying of a LETTER-size document, a percentage of the high-speed scanning region used for return-scan is high in the case of copying of a LEDGER-size document so that the duration of the period T3 can be easily reduced by 0.2 (s).

T1, T4, T6, Mp and Mmax are design values predetermined for each copy size and are stored in the ROM 112 of the controller 11.

The CPU 110 reads the design values T1, T4, T6, Mp and Mmax from the ROM 112 in accordance with the size of a document selected by means of the copy document selecting section 17, and obtains T2 from the relation [Exp. 12]. It also reads out the design values Y, Sy and tc from the ROM 112 and calculates the read-scanning speed from Vx=Sy/T2 (mm/s) based on the obtained value of T2. Further, it calculates the set pixel number Bx from the equations [Exp. 8] and [Exp. 9] provided that Vx=Vs. The set pixel number Bx is set in the latch 507 in the sensor driving circuit 5.

Furthermore, the CPU 110 reads out Vmax, Vmin and Y from the ROM 112 and calculates Tmax and Tmin from the equations [Exp. 4] and [Exp. 5]. It also reads out Amin and Amax from the RAM 111 and calculates the amplification value Again from the correction formula [Exp. 7]. The amplification value Again obtained is set in the latch 607. The CPU 110 further calculates the factor K from K=Again/Amin based on the obtained value Again and set it in the latch 614.

When TBs (°C.) is the temperature at the time of correction of a black level stored in the RAM and TBst (°C.) is the temperature newly detected by the temperature detection sensor 20 of the controller 11, the CPU 110 of the controller 11 also compares TBs (°C.) with TBst (°C.). When TBst>TBs (°C.) holds, the factor Kx is calculated from Kx=α×(TBst−TBs)×K where α is the rate of temperature change (times/°C.). Then, a correction is made in the factor K in order to set the factor Kx in the latch 614. α is an experimentally obtainable value and stored in the ROM 112.

With the above setting, the resolution Y (dot/mm) in the sub-scanning direction can be made constant and high-precision quantization of analog signal and black level correction can be achieved even if the read-scanning speed is varied.

The present invention has been applied to a monochrome image reader and a monochrome image reproducing system in the foregoing embodiments however the invention may be applied to a color image reader and a color image reproducing system. More specifically, the line sensor 1 may be a three-color (red, blue and green) sensor and the printer 14 may be a color printer for producing color images with recording colors yellow, cyan, magenta and black.

The invention can be easily applied to a color image reader by such an arrangement that the signal processing circuit according to the foregoing embodiment is provided for each of colors red, blue and green and they are connected in parallel. Such an image reader can be connected to a color printer by performing image processing in which the recording colors, yellow, cyan, magenta and black are produced from parallel signals of three colors, red, blue and green.

When such a color printer produces color images by the flame sequential method, the operation performed by one reciprocating movement of the line sensor in the above embodiment should be repeated four times so that high-speed color image copying can be achieved.

When such a color printer produces color images by concurrent processing, the line sensor may be reciprocated once like the above embodiment so that high-speed color image copying can be achieved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reader comprising:
   an image reading line sensor for reading out data from an original document line by line to be converted into digital image data;
   storage means capable of storing at least one line of read-out data;
   sub-scanning means for controlling the image reading line sensor such that the line sensor accelerates up to a scanning speed which is equal to or higher than a record-scanning speed of an image data output device;
   first controlling means for determining a first line and a last line to be read by the image reading line sensor in a sub-scanning direction, in relation to the sub-scanning speed of the image reading line sensor; and
   second controlling means for controlling the storage means to sequentially store image data items which fall in an effective range on one line of image data read by the image reading line sensor, the storing of data being carried out during a fixed time period equal to or shorter than a minimum duration of a cycle in which one line is read out, and to sequentially release the stored image data items line by line in accordance with the record-scanning speed of the output device.

2. An image reader according to claim 1 further comprising:
   timing generator means for generating a timing signal for determining the duration of the cycle in which one line is read by the image reading line sensor; and
   timing controlling means for varying the time interval between generations of the timing signal, according to the sub-scanning speed of the image reading line sensor such that constant resolution can be obtained even if the sub-scanning speed varies.

3. An image reader according to claim 2 further comprising speed detection means for detecting the sub-scanning speed of the image reading line sensor, wherein said timing controlling means controls the time interval between generations of the timing signal, according to the result of detection executed by the speed detection means.

4. An image reader according to claim 3, wherein said timing controlling means varies, on a scanning line basis, the time interval between generations of the timing signal executed by the timing generator means.

5. An image reader according to claim 3, wherein said timing controlling means varies, on a basis of a cycle of a transfer pulse in which the image data read by the reading line sensor is transferred therefrom, the time interval between generations of the timing signal executed by the timing generator means.

6. An image reader according to claim 5, wherein said transfer pulse maintains a constant cycle without varying in accordance with the scanning speed.

7. An image reader according to claim 2, wherein said first controlling means allows the image reading line sensor to start its image reading operation when the time interval between generations of the timing signal falls within a range within which the time interval is controllable by the timing controlling means and to terminate the image reading operation when the time interval is out of the range.

8. An image reader according to claim 7, wherein said second controlling means executes only storing of image data while the image reading line sensor accelerates in the sub-scanning direction and allows the stored image data to be released after the image reading line sensor has started scan at the fixed speed or a decelerated speed in the sub-scanning direction.

9. An image reader according to claim 8, wherein a maximum storage amount by said storage means is equal to the difference between the amount of read image data that have been sequentially input from the image reading line sensor to the storage means and the amount of image data that have been sequentially output from the storage means line by line in accordance with the record-scanning speed of the output device.

10. An image reader according to claim 9, wherein said timing controlling means varies, on a scanning line basis, the time interval between generations of the timing signal executed by the timing Generator means.

11. An image reader according to claim 2 further comprising:
    amplifier means for amplifying an output image signal from the image reading line sensor; and
    amplification controlling means for varying the amount of amplification executed by the amplifier means in accordance with the time interval between generations of the timing signal executed by the timing generator means.

12. An image reader according to claim 11 further comprising:
    black level correcting means for correcting a black level signal issued from the image reading line sensor; and
    correction controlling means for varying a correction value for the black level correcting means in accordance with the amplification amount of the amplifier means.

13. An image reader according to claim 12, wherein on a scanning line basis, said amplification controlling means varies the amplification amount of the amplifier means and said correction controlling means varies the correction value for the black level correcting means.

14. An image reader according to claim 13, wherein said amplification controlling means computes data for the amplification amount by interpolation from the data of a maximum amplification amount and the data of a minimum amplification amount which are set in the amplifier means, and varies the amplification amount of the amplifier means in accordance with the varying time interval between generations of the timing signal executed by the timing generator means.

15. An image reader according to claim 11 further comprising:
    black level correcting means for correcting a black level signal issued from the image reading line sensor;
    temperature detecting means for detecting the difference between a temperature at which the black level correction for the image reading line sensor is performed and a temperature at which data are read out from the original document; and
    correction controlling means for varying a correction value for the black level correcting means in accordance with the amplification amount of the amplifier means and the amount of a change in temperature detected by the temperature detecting means.

16. An image reader according to claim 15, wherein on a scanning line basis, said amplification controlling means varies the amplification amount of the amplifier means and said correction controlling means varies the correction value for the black level correcting means.

17. An image reproducing system comprising:
an image reading line sensor for reading out data from an original document line by line to be converted into digital image data;
storage means capable of storing at least one line of read-out data;
recording means for reading data from the storage means and recording the data at a fixed record-scanning speed;
sub-scanning means for controlling the image reading line sensor such that the line sensor accelerates up to a scanning speed which is equal to or higher than the record-scanning speed of the recording means;
first controlling means for determining a first line and a last line to be read by the image reading line sensor in a sub-scanning direction, in relation to the sub-scanning speed of the image reading line sensor; and
second controlling means for controlling the storage means to sequentially store image data items which fall in an effective range on one line of image data read by the image reading line sensor, the storing of data being carried out during a fixed time period equal to or shorter than a minimum duration of a cycle in which one line is read out, and to sequentially release the stored image data items line by line in accordance with the record-scanning speed of the recording means.

18. An image reproducing system according to claim 17 further comprising:
timing generator means for generating a timing signal for determining the duration of the cycle in which one line is read by the image reading line sensor; and
timing controlling means for varying the time interval between generations of the timing signal, according to the sub-scanning speed of the image reading line sensor such that constant resolution can be obtained even if the sub-scanning speed varies.

19. An image reproducing system according to claim 18 further comprising speed detection means for detecting the sub-scanning speed of the image reading line sensor, wherein said timing controlling means controls the time interval between generations of the timing signal, according to the result of detection executed by the speed detection means.

20. An image reproducing system according to claim 19, wherein said timing controlling means varies, on a scanning line basis, the time interval between generations of the timing signal executed by the timing generator means.

21. An image reproducing system according to claim 19, wherein said timing controlling means varies, on a basis of a cycle of a transfer pulse in which the image data read by the reading line sensor is transferred therefrom, the time interval between generations of the timing signal executed by the timing generator means.

22. An image reproducing system according to claim 21, wherein said transfer pulse maintains a constant cycle without varying in accordance with the scanning speed.

23. An image reproducing system according to claim 18, wherein said first controlling means allows the image reading line sensor to start its image reading operation when the time interval between generations of the timing signal falls within a range within which the time interval is controllable by the timing controlling means and to terminate the image reading operation when the time interval is out of the range.

24. An image reproducing system according to claim 23, wherein said second controlling means executes only storing of image data while the image reading line sensor accelerates in the sub-scanning direction and allows the stored image data to be released after the image reading line sensor has started scan at the fixed speed or a decelerated speed in the sub-scanning direction.

25. An image reproducing system according to claim 24, wherein a maximum storage amount by said storage means is equal to the difference between the amount of read image data that have been sequentially input from the image reading line sensor to the storage means and the amount of image data that have been sequentially output from the storage means line by line in accordance with the record-scanning speed of the recording means.

26. An image reproducing system according to claim 25, wherein said timing controlling means varies, on a scanning line basis, the time interval between generations of the timing signal executed by the timing generator means.

27. An image reproducing system according to claim 17 further comprising specifying means for specifying an original document size, wherein said sub-scanning means alters the sub-scanning speed of the image reading line sensor in accordance with the original document size thus specified.

28. An image reproducing system according to claim 27 further comprising:
timing generator means for generating a timing signal to determine the duration of the cycle in which one line is read by the image reading line sensor; and
timing controlling means for varying the time interval between generations of the timing signal, according to the sub-scanning speed of the image reading line sensor such that constant resolution can be obtained even if the sub-scanning speed varies.

29. An image reproducing system according to claim 28 further comprising speed detection means for detecting the sub-scanning speed of the image reading line sensor, wherein said timing controlling means controls the time interval between generations of the timing signal, according to the result of detection executed by the speed detection means.

30. An image reproducing system according to claim 29, wherein said timing controlling means varies, on a scanning line basis, the time interval between generations of the timing signal executed by the timing generator means.

31. An image reproducing system according to claim 24 further comprising:
amplifier means for amplifying an output image signal from the image reading line sensor; and
amplification controlling means for varying the amount of amplification executed by the amplifier means in accordance with the time interval between generations of the timing signal executed by the timing generator means.

32. An image reproducing system according to claim 31, further comprising:
   black level correcting means for correcting a black level signal issued from the image reading line sensor; and
   correction controlling means for varying a correction value for the black level correcting means in accordance with the amplification amount of the amplifier means.

33. An image reproducing system according to claim 32, wherein on a scanning line basis, Said amplification controlling means varies the amplification amount of the amplifier means and said correction controlling means varies the correction value for the black level correcting means.

34. An image reproducing system according to claim 33, wherein said amplification controlling means computes data for the amplification amount by interpolation from the data of a maximum amplification amount and the data of a minimum amplification amount which are set in the amplifier means, and varies the amplification amount of the amplifier means in accordance with the varying time interval between generations of the timing signal executed by the timing generator means.

35. An image reproducing system according to claim 31 further comprising:
   black level correcting means for correcting a black level signal issued from the image reading line sensor;
   temperature detecting means for detecting the difference between a temperature at which the black level correction for the image reading line sensor is performed and a temperature at which data are read out from the original document; and
   correction controlling means for varying a correction value for the black level correcting means in accordance with the amplification amount of the amplifier means and the amount of a change in temperature detected by the temperature detecting means.

36. An image reproducing system according to claim 35, wherein on a scanning line basis, said amplification correcting means varies the amplification amount of the amplifier means and said correction controlling means varies the correction value for the black level correcting means.

37. An image reproducing system according to claim 27, wherein said first controlling means allows the image reading line sensor to start its image reading operation when the time interval between generations of the timing signal falls within a range within which the time interval is controllable by the timing controlling means and to terminate the image reading operation when the time interval is out of the range.

38. An image reproducing system according to claim 37, wherein said second controlling means executes only storing of image data while the image reading line sensor accelerates in the sub-scanning direction and allows the stored image data to be released after the image reading line sensor has started scan at the fixed speed or a decelerated speed in the sub-scanning direction.

39. An image reproducing system according to claim 38, wherein a maximum storage amount by said storage means is equal to the difference between the amount of read image data that have been sequentially input from the image reading line sensor to the storage means and the amount of image data that have been sequentially output from the storage means line by line in accordance with the record-scanning speed of the recording means.

40. An image reproducing system according to claim 39, wherein said timing controlling means varies, on a scanning line basis, the time interval between generations of the timing signal executed by the timing generator means.

* * * * *